US012709492B2

(12) United States Patent
O'Hern et al.

(10) Patent No.: US 12,709,492 B2
(45) Date of Patent: Aug. 18, 2026

(54) SYSTEMS AND METHODS FOR DYNAMIC PROCESSING OF OBJECTS USING INTERMEDIATE STORAGE CACHES

(71) Applicant: Berkshire Grey Operating Company, Inc., Bedford, MA (US)

(72) Inventors: Ryan O'Hern, Reading, MA (US); Conor O'Neil, Boston, MA (US); Joshua Best, Raleigh, NC (US); John Richard Amend, Jr., Fort Collins, CO (US); Kyle Brown, Westford, MA (US); Ashwin Deshpande, Lexington, MA (US); Nicholas Eckenstein, Lowell, MA (US); Dominick Freeman, Kansas City, MO (US); Christopher Geyer, Arlington, MA (US); David King, Cambridge, MA (US); Joseph Romano, Arlington, MA (US); Jeremy Saslaw, Cambridge, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 29 days.

(21) Appl. No.: 18/736,803

(22) Filed: Jun. 7, 2024

(65) Prior Publication Data

US 2024/0409326 A1 Dec. 12, 2024

Related U.S. Application Data

(60) Provisional application No. 63/472,058, filed on Jun. 9, 2023.

(51) Int. Cl.

| | |
|---|---|
| ***B65G 47/90*** | (2006.01) |
| ***B65G 1/137*** | (2006.01) |
| ***B65G 47/51*** | (2006.01) |

(52) U.S. Cl.
CPC ......... *B65G 47/905* (2013.01); *B65G 1/1378* (2013.01); *B65G 47/5145* (2013.01); *B65G 47/5154* (2013.01); *B65G 47/90* (2013.01)

(58) Field of Classification Search
CPC .............. B65G 1/1378; B65G 47/5113; B65G 47/5145; B65G 47/905; B65G 47/90
(Continued)

(56) References Cited

U.S. PATENT DOCUMENTS

| | | | |
|---|---|---|---|
| 6,011,998 A | 1/2000 | Lichti et al. | |
| 6,516,935 B1 * | 2/2003 | McLennan | B23Q 7/1426 198/346.2 |

(Continued)

FOREIGN PATENT DOCUMENTS

| | | |
|---|---|---|
| EP | 1352831 A1 | 10/2003 |
| EP | 2233400 A1 | 9/2010 |

(Continued)

OTHER PUBLICATIONS

International Search Report and Written Opinion of the International Searching Authority (the European Patent Office) issued in related international application No. PCT/US2024/032927 on Aug. 27, 2024, 15 pages.

(Continued)

*Primary Examiner* — James R Bidwell
(74) *Attorney, Agent, or Firm* — Gesmer Updegrove LLP

(57) ABSTRACT

A method of processing objects with a programmable motion device includes receiving a plurality of received objects at an input area proximate the programmable motion device, selecting and grasping a first object of the plurality of received objects from the input area using the programmable motion device, moving the first object to a cache area using the programmable motion device, the cache area being proximate the programmable motion device, selecting and
(Continued)

grasping a second object of the plurality of received objects, moving the second object to a first destination location using the programmable motion device, selecting and grasping the first object from the cache area using the programmable motion device, and moving the first object to the first destination location using the programmable motion device.

30 Claims, 19 Drawing Sheets

(58) Field of Classification Search
USPC .......................................... 198/347.1–347.4
See application file for complete search history.

(56) References Cited

U.S. PATENT DOCUMENTS 8,721,252 B2 * 5/2014 Osada .................... B65G 47/22
414/268
8,833,545 B2 * 9/2014 Perl ...................... B65G 47/244
198/370.01
10,906,740 B2 * 2/2021 Wagner ................. B07C 5/3412
11,472,022 B2 * 10/2022 Wagner ................ B65G 1/1378
2010/0316479 A1 * 12/2010 Perl ........................... B07C 5/36
414/800
2018/0057264 A1 * 3/2018 Wicks .................. B65G 1/1376
2021/0276798 A1 * 9/2021 Velagapudi .......... B65G 1/1376

FOREIGN PATENT DOCUMENTS

EP 2520524 A1 11/2012
EP 2650237 A1 10/2013
JP 2012188231 A 10/2012
JP 2017056528 A 3/2017
WO 2014042361 A1 3/2014
WO 2016156415 A1 10/2016
WO 2018044851 A1 3/2018
WO 2019212584 A1 11/2019
WO 2019238728 A1 12/2019
WO 2020086995 A1 4/2020
WO 2022094298 A1 5/2022

OTHER PUBLICATIONS

International Preliminary Report on Patentability issued by the International Bureau of WIPO in related international application No. PCT/US2024/032927 on Dec. 9, 2025, 8 pages.

* cited by examiner

SYSTEMS AND METHODS FOR DYNAMIC PROCESSING OF OBJECTS USING INTERMEDIATE STORAGE CACHES

PRIORITY

The present application claims priority to U.S. Provisional Patent Application 63/472,058 filed Jun. 9, 2023, the disclosure of which is hereby incorporated by reference in its entirety.

BACKGROUND

The invention generally relates to object processing systems and relates in particular to object processing systems that individually handle objects being processed (e.g., distributed or sorted) while the objects are being processed.

Current object processing systems generally involve the processing of a large number of objects, where the objects are received in either organized or disorganized batches, and must be routed to desired destinations in accordance with a manifest or specific addresses on the objects (e.g., in a mailing system).

Current distribution center sorting systems, for example, generally assume an inflexible sequence of operations whereby a disorganized stream of input objects is first singulated into a stream of isolated objects presented one at a time to a scanner that identifies the object. An induction element (e.g., a conveyor, a tilt tray, or manually movable bins) transport the objects to the desired destination or further processing station, which may be a bin, a chute, a bag or a conveyor, etc.

In typical parcel sortation systems, human workers or automated systems typically retrieve parcels in an arrival order and sort each parcel or object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins are required.

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full or the controlling software system determines that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Human personnel is also sometimes required where the information to be captured regarding an object is difficult to obtain by scanning or camera based systems, or is highly sensitive such as weights of very light objects. If a wide range of objects are being processed, for example, then such a weight detection system must be able to accommodate receipt of the wide range of objects.

There remains a need for more efficient and more cost-effective object processing systems that process objects of a variety of sizes and weights, and that efficiently distributes these objects to processing locations.

SUMMARY

In accordance with an aspect, the invention provides a method of processing objects with a programmable motion device. The method includes receiving a plurality of received objects at an input area proximate the programmable motion device, selecting and grasping a first object of the plurality of received objects from the input area using the programmable motion device, moving the first object to a cache area using the programmable motion device, said cache area being proximate the programable motion device, selecting and grasping a second object of the plurality of received objects, moving the second object to a first destination location using the programmable motion device, selecting and grasping the first object from the cache area using the programmable motion device, and moving the first object to the first destination location using the programmable motion device.

In accordance with another aspect, the invention provides a method of processing objects with a programmable motion device. The method includes receiving a plurality of objects at an input area proximate the programmable motion device, selecting, grasping and moving the plurality of objects in a first order from the input area to a plurality of cache locations at a cache area, and selecting, grasping and moving the plurality of objects from the plurality of cache locations in a second order that is different than the first order to at least one destination location.

In accordance with a further aspect, the invention provides an object processing system including an object processing station that receives objects from an input conveyance system and provides objects to an output system. The object processing system further includes an intermediate cache area including a plurality of intermediate storage locations at which a subset of the plurality of objects are placed prior to being moved to the output system.

BRIEF DESCRIPTION OF THE DRAWINGS

The following description may be further understood with reference to the accompanying drawings in which.

Figure 1A:
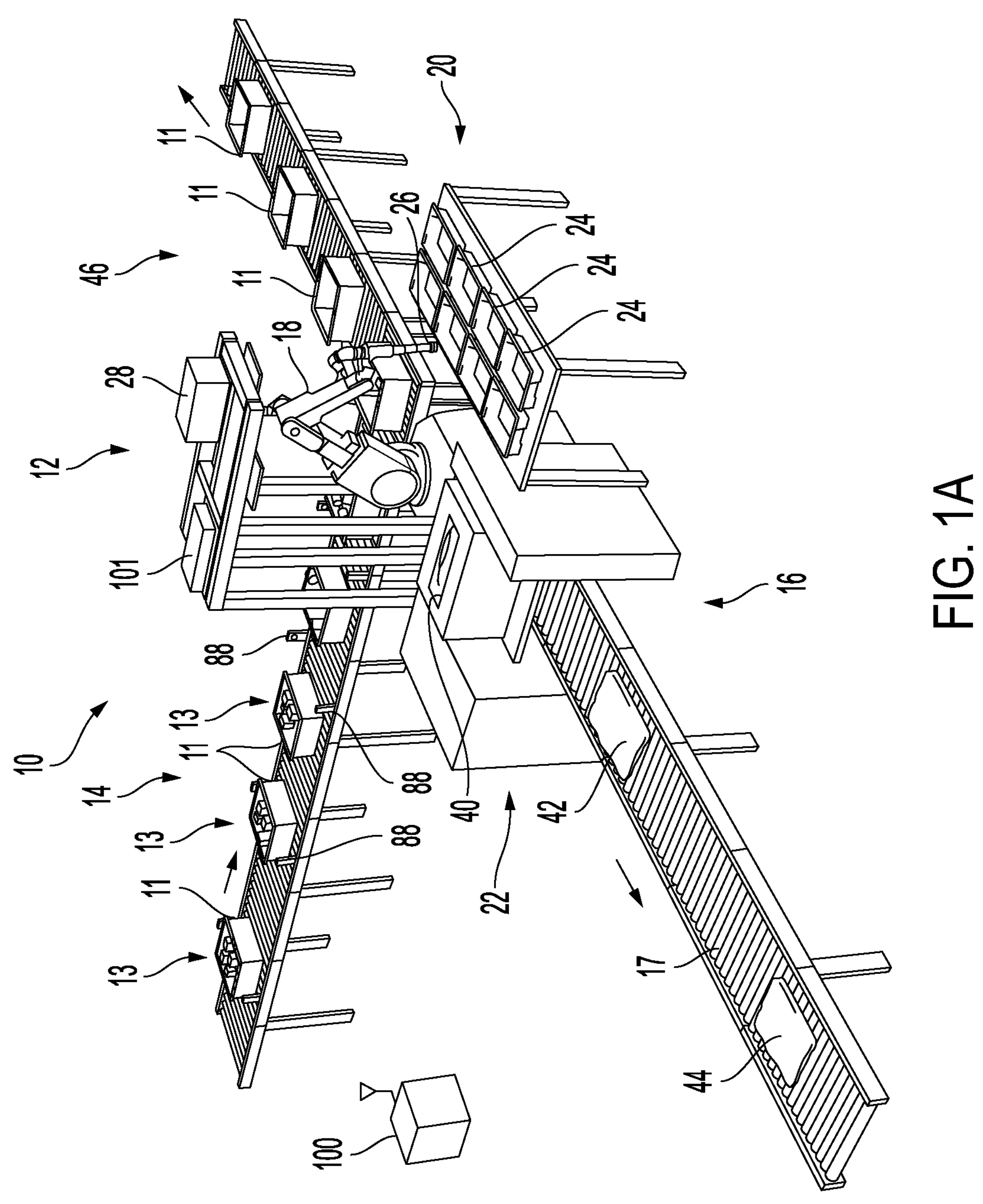
FIGS. 1A and 1B show illustrative diagrammatic views of an object processing system in accordance with an aspect of the present invention, showing an output system with an automated bagging system (FIG. 1A) and showing an output system with a container packing system (FIG. 1B)

The drawings are shown for illustrative purposes only.

DETAILED DESCRIPTION

Applicants have discovered a need for systems and processes for handling automated object processing tasks where objects are required to be grouped together. In robotic and manual picking operations, scenarios are sometimes encountered where objects must be grouped together in a container to complete an operation. For example, in eCommerce order fulfillment operations all objects in a customer's order must be grouped together in a bag, box, or other container before being shipped to the customer. It is often the case that objects arrive to a packer for this grouping operation in a batch, out-of-sequence (e.g., random). In the batch case, objects for many customer orders arrive to the packer mixed together in one or more containers. In the out-of-sequence case, objects arrive to the picker one-by-one in random order (as opposed to in a sequence in which SKUs are grouped together). As used herein the term "objects" refer to units, items, SKUs, articles, etc. as well as bags or boxes including such units, items, SKUs and articles, etc. Applicants have discovered that in such systems, temporary storage locations (or caching systems) may be used.

Many eCommerce operations use batch picking to assemble the objects required for one or more customer orders. In this type of operation, one or more persons is responsible for picking all objects required to fulfill many customer orders. These objects are picked from shelves or automated storage systems and placed into one or more containers and brought to a second location where a packout task is performed: the objects are picked again, out of the batched container(s), and sorted according to which customer orders require which objects. The methods described here allow a robotic picker to perform the packout task from batch picked totes more efficiently.

Other eCommerce operations avoid the batching step. Objects required to fulfill a customer order are sent directly to the packout location without being picked into an intermediate storage container. For example, the primary storage container holding the needed object may be sent to a packout station using a conveyor system and automation technology like an automated storage system. Some operations perform this transport task with mobile robots. It may be the case that objects for multiple customer orders will be sent to a packout station without any preliminary sequencing. An object for order A may arrive after an object for order B, followed by an object for order C, and then another object for order A, etc. This requires the packout operator to maintain intermediate storage locations for each of these orders so that he can pick objects as they arrive. The methods described here also serve to solve this problem.

Another use case concerns storage systems that utilize mixed-SKU containers. If objects are stored together in a container—as distinguished from keeping one unique object per container—the robotic picker has the challenge to find and pick the right object from the container. This can be done by looking into the container and identifying objects before picking or by first picking an object and then identifying it, for example when using a barcode scanner for object identification. The methods described here serve to improve efficiency in both of these cases, as they allow the picker to remove an identified object from the storage container and keep it at an intermediate storage location until that object is needed later. This use case is further described below.

Caching implementations described herein include implementations that are static (do not move), and implementations that are dynamic. FIG. 1A for example shows an object processing system 10 that includes an object processing station 12 at which objects are processed from an in-feed conveyance system 14 and provided to an output system 16. Inventory items 13 are presented to the object processing system 10 in input bins 11 on the in-feed conveyance system 14. The inventory items 13 can be pre-sorted, order-specific groupings of items with all inventory items 13 in one or more input bin 11. The input bin 11 may contain inventory items 13 of mixed SKUs or the input bin 11 may contain inventory items 13 of any one SKU The processing station 12 includes programmable motion device 18 and may also include an intermediate staging area 20 at which objects may be temporarily placed prior to being moved to the output system 16, which may for example include an automated bagging system 22.

The intermediate staging area (or cache area) 20 includes a plurality of stationary locations 24 at which objects may be placed prior to being moved to the automated bagging system 22 of the output system 16. The programmable motion device 18 may for example, include an end-effector 26 with a vacuum cup coupled to a high flow vacuum source 28 as well as one or more computer processing systems 100, 101 that control the movement of the programmable motion device 18 as well as all processing conveyance systems responsive to perception input and process control systems. The output system 16 may include the automated bagging system 22 that receives objects from the programmable motion device 18 either directly from the input bins 11 or via the intermediate staging area 20 as discussed herein.

Figure 1B:
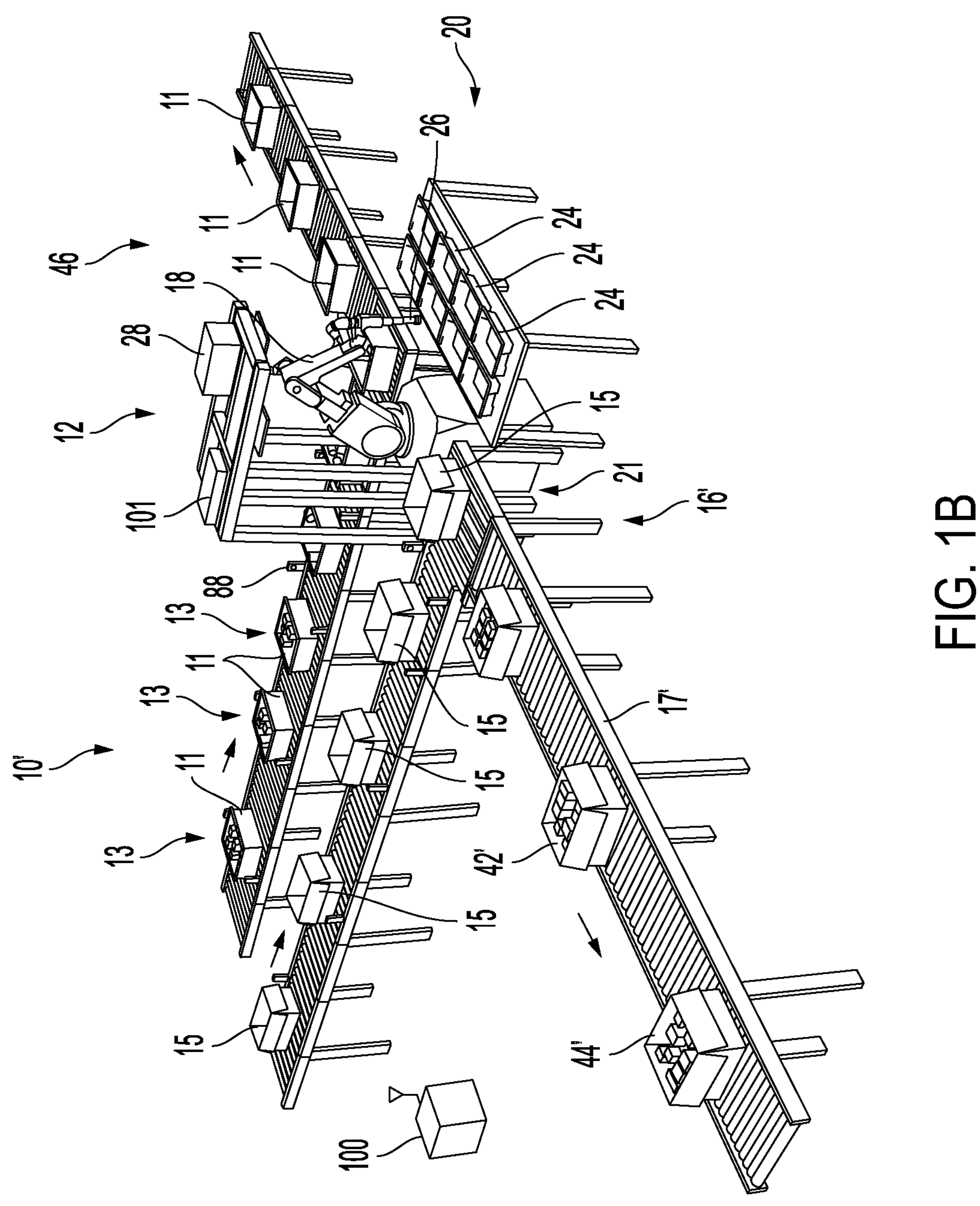

In accordance with further aspects, and with reference to FIG. 1B, the output system 16' of the object processing system 10' may include a packing station 21 that receives empty output totes 15 (e.g., shipping boxes). The object processing system 10' operates the programmable motion device 18 to transfer items from the input bins 11 to the output tote 15 at the packing station 21 to fulfill the current order and utilizing the intermediate staging area 20 as required to temporarily store items in the intermediate storage location 24 as described herein. Additionally, the items temporarily stored in the intermediate storage location 24 may be selected and placed in the output tote 15 at the packing station 21 as necessary. Accordingly, the current output tote 15 at the packing station 21 receives objects from the programmable motion device 18 either directly from the input bins 11 or via the intermediate staging area 20 as discussed herein.

Figures 2A, 2B:
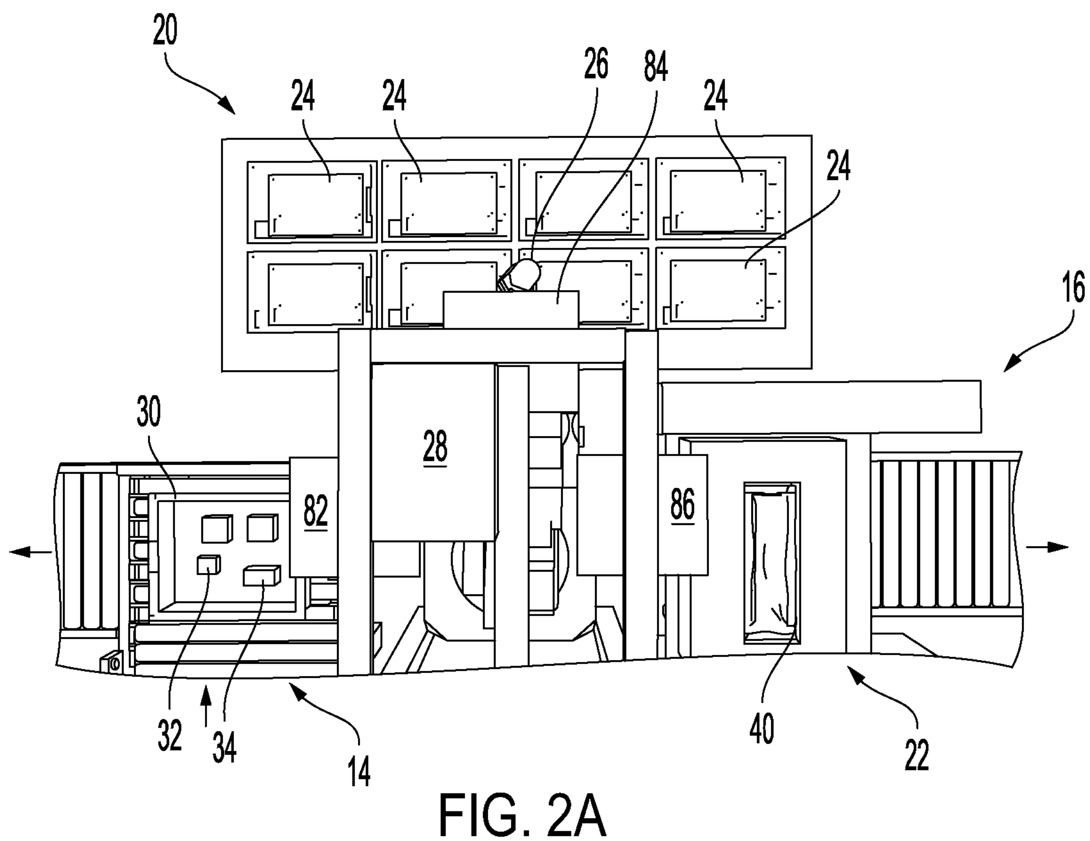
FIGS. 2A-2D show illustrative diagrammatic plan views of a portion of the object processing system of FIG. 1A, showing a first object being identified (FIG. 2A), showing the first object being moved to an intermediate storage location (FIG. 2B), showing another object being moved (FIG. 2C), and showing the new objecting having its pose adjusted for placement at a destination location (FIG. 2D)
Figure 2C:
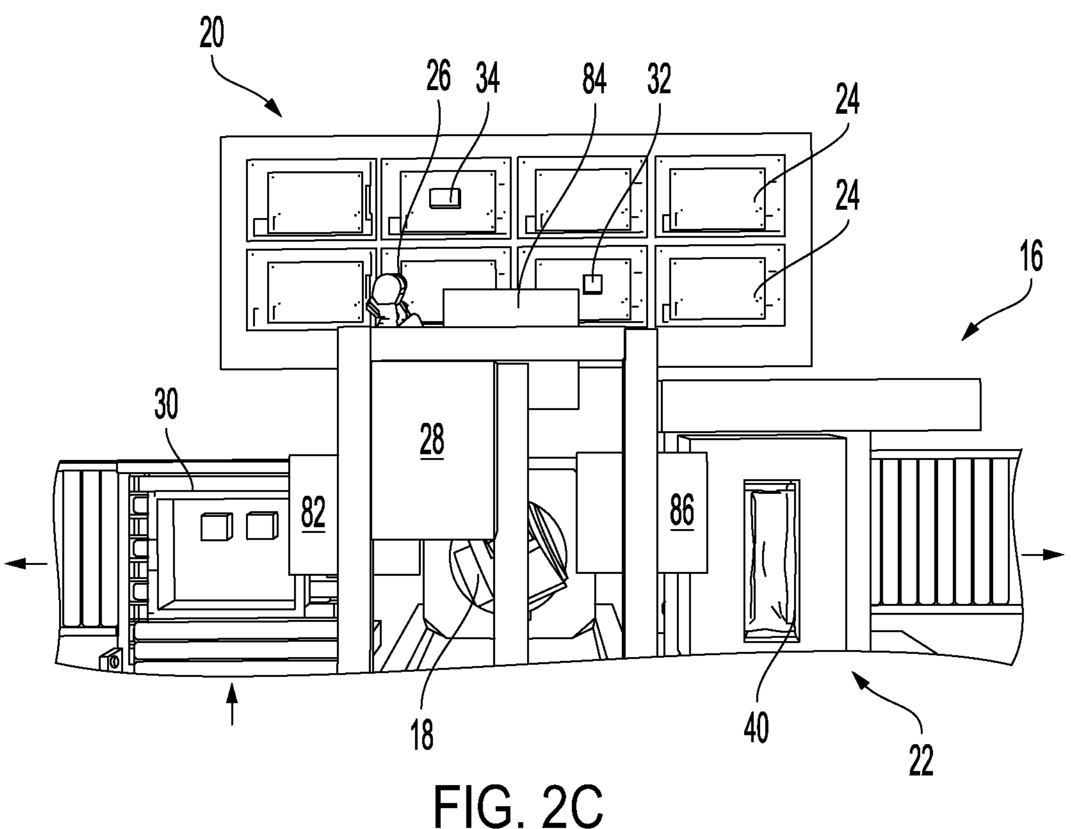
Figure 2D:
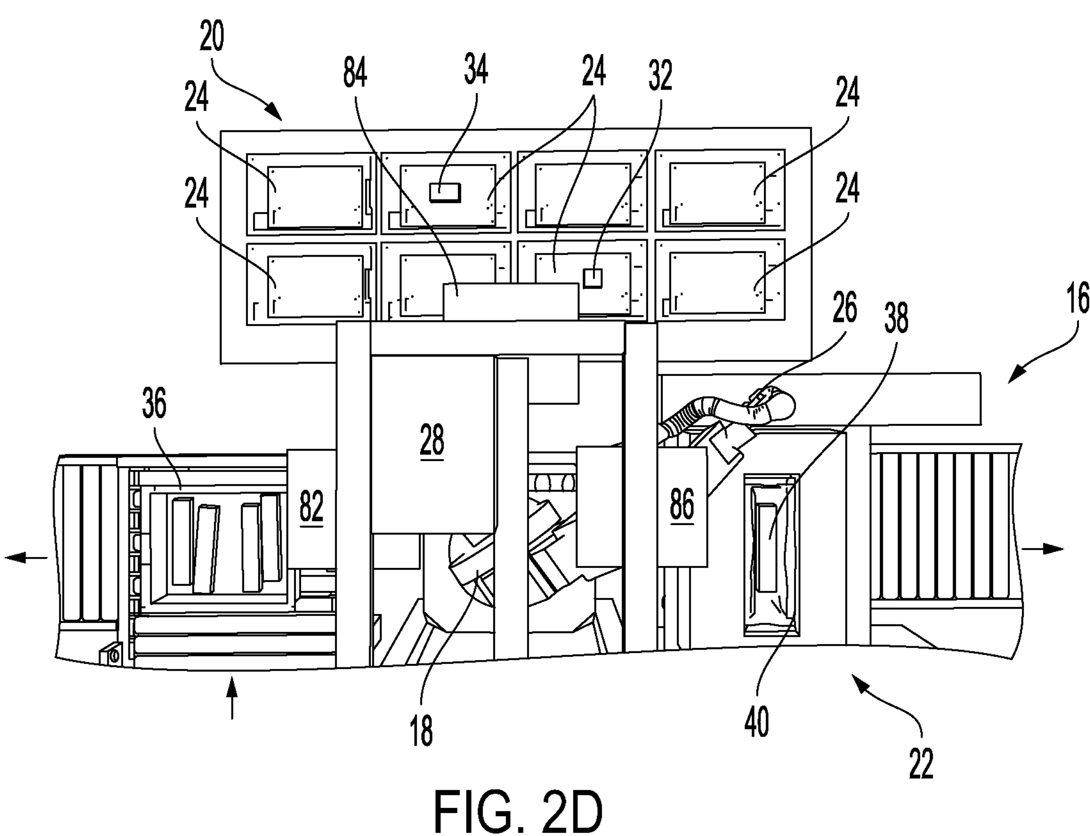

The system may use the intermediate staging area 20 to temporarily place some objects while other objects are being processed by the programmable motion device 18. In particular and with reference to FIGS. 2A-2D the system may identify a first object 32 in an input bin 30 at the input conveyance system 14 (FIG. 2A) and may grasp and move the object 32 to an intermediate storage location 24 (FIG. 2B). The system may return to the input bin 30 (or any other bin that is positioned at the input area) and move another object 34 to the same or another intermediate storage location 24 (FIG. 2C). With the objects 32, 34 being held at the intermediate storage locations, the system may then acquire new object 38 from a further input bin 36 (e.g., that the system knew was waiting to be processed, and move the object 38 to the automated bagging system 22 at the output system 16). In particular, the system may place the object 38 into a bag formation opening 40 of the automated bagging system 22 as shown in FIG. 2D. Emptied or otherwise finished input bins 11, such as those input bins 11 containing inventory items 13 of more than one SKU may be returned to storage inventory, or otherwise removed for disposal or re-use as shown at 46.

In this way, the system may hold certain objects while other objects are being processed, which provides greater flexibility of sequences of packing as well as in assessing the input stream prior to making any decisions regarding output combinations and assignments, for example, by first unpacking some or all of an input bin prior to assigning objects to particular destination locations (e.g., bag combinations 42, 44 as shown in FIG. 1A). The assigned destination locations such as bags 42, 44 may be provided in the output system 16 on a conveyor 17 that leads to any of manual or automatic servicing (e.g., take-away) areas as discussed further below with reference to FIGS. 21, 22. Additionally, since the programmable motion device placed each object (e.g., 32, 34) in an intermediate storage location 24, the system knows the identity of the object and the exact location of the object, which facilitates regrasping and subsequent movement of the object.

Figure 3:
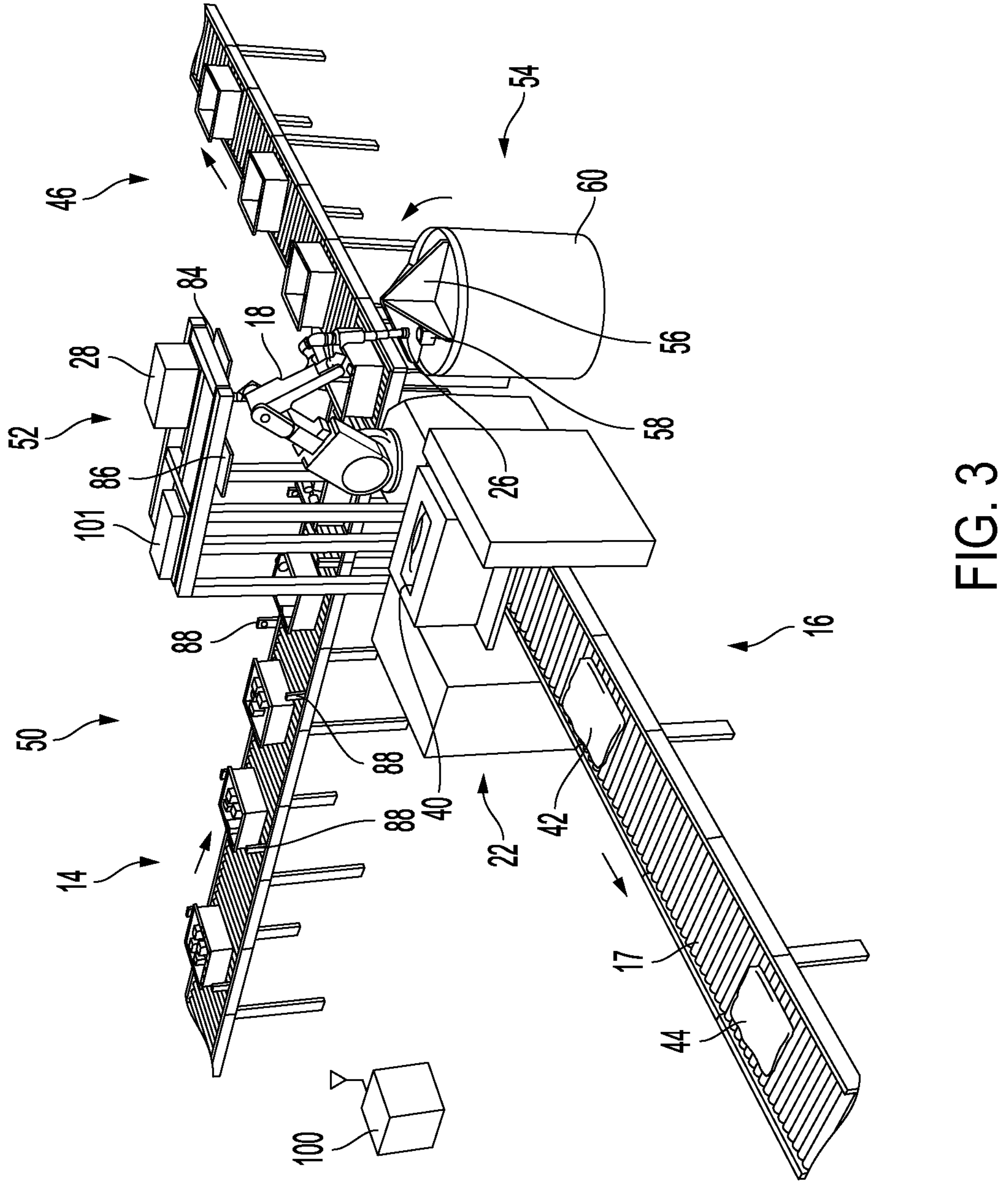
FIG. 3 shows an illustrative diagrammatic view of another object processing system in accordance with an aspect of the present invention that includes an automated bagging system and an intermediate staging area with a rotating structure.

Dynamic caches are able to move a desired cache location to a common point in space (e.g., have first portion that moves with respect to a second portion). For example, the moving cache may be provided by a rotating platform such that any object thereon may be brought to the programmable motion device (e.g., robot). Such a rotating platform (e.g., rotating in either direction) provides a dynamic cache. This ability to move any cache location to a common place in space has several advantages for robotic pick-and-place operations:

FIG. 3 for example shows an object processing system 50 in accordance with another aspect of the present invention that includes an object processing station 52 at which objects are processed from an in-feed conveyance system 14 and provided to an output system 16 as discussed above. The processing station 52 includes programmable motion device 18 and may also include an intermediate staging area 54 at which objects may be temporarily placed prior to being moved to the output system 16, which may for example include an automated bagging system 22. The intermediate staging area 54 includes a plurality of intermediate storage locations that move, for example by rotating a partitioned rotating structure 56 relative a base 60. The partitioned rotating structure 56 may for example define a number (e.g., four) of intermediate storage locations any of which may receive any object (e.g., 58) and may be in either rotational direction.

The system therefore provides for moving target cache locations, any one of which may be requested to again present its contents to the end-effector 26 at a known location (and position) for regrasping. An advantage of a non-stationary (moving) cache is that moving a target cache location to a common location in space allows the transfer trajectory of the robot to remain roughly constant regardless of which cache location into which the robot is placing the object. The cache mechanism brings the right cache location to a given point in space, and the robot is always placing to the cache location at that point thereby effectively decreasing the handling time for each item transferred to increase the overall throughput of the system.

Another advantage is that perception hardware can be shared across cache locations with a dynamic (moving) cache. A static cache requires that any perception technology required to enable the robot to pick from the cache or place into the cache must be able to see into all cache locations. This can require one or many cameras or other sensor devices to achieve. With a mechanism to move cache locations to the same point in space for pick-and-place operations, a single perception device can be pointed to look at only that one location, eliminating the need for additional perception hardware.

Figure 4:
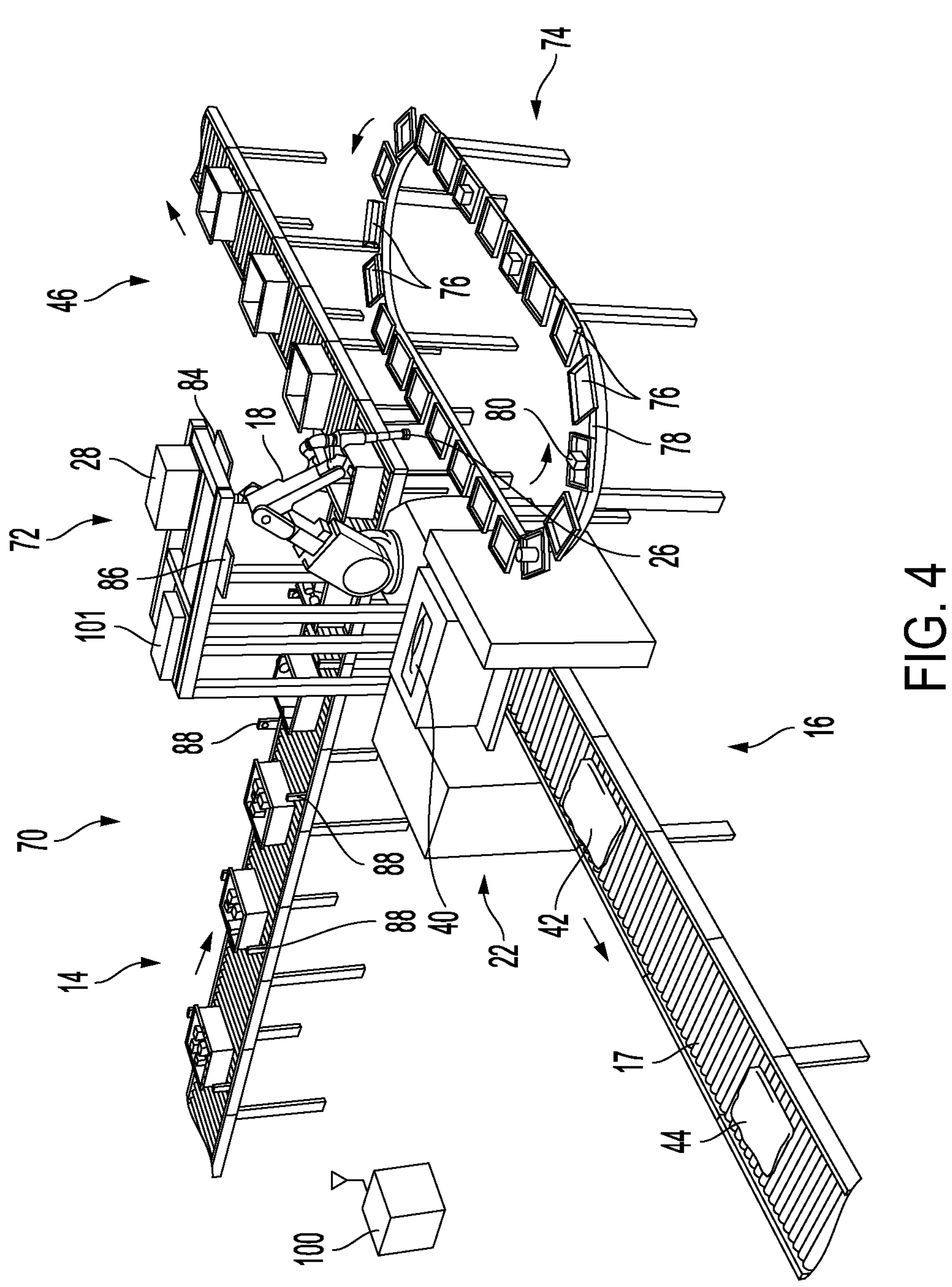
FIG. 4 shows an illustrative diagrammatic view of another object processing system in accordance with an aspect of the present invention that includes an automated bagging system and an intermediate staging area with intermediate storage locations on a horizontally rotating track system.

FIG. 4 shows an object processing system 70 in accordance with another aspect of the present invention that includes a plurality of storage locations that move along a continuous horizontal track circuit. The system 70 includes an object processing station 72 at which objects are processed from an in-feed conveyance system 14 and provided to an output system 16 as discussed above. The processing station 72 includes programmable motion device 18 and may also include an intermediate staging area 74 at which objects may be temporarily placed prior to being moved to the output system 16, which may for example include an automated bagging system 22. The intermediate staging area 74 includes a plurality of intermediate storage locations 76 that move along a track system 78 in a circuit as shown. The intermediate storage locations 76 may each receive any object (e.g., 80) for temporarily holding during processing as discussed herein. The track 78 may be powered by a power source that drives the track system, or each of the intermediate storage locations 78 may be powered to run along the track, which remains stationary.

Figure 5:
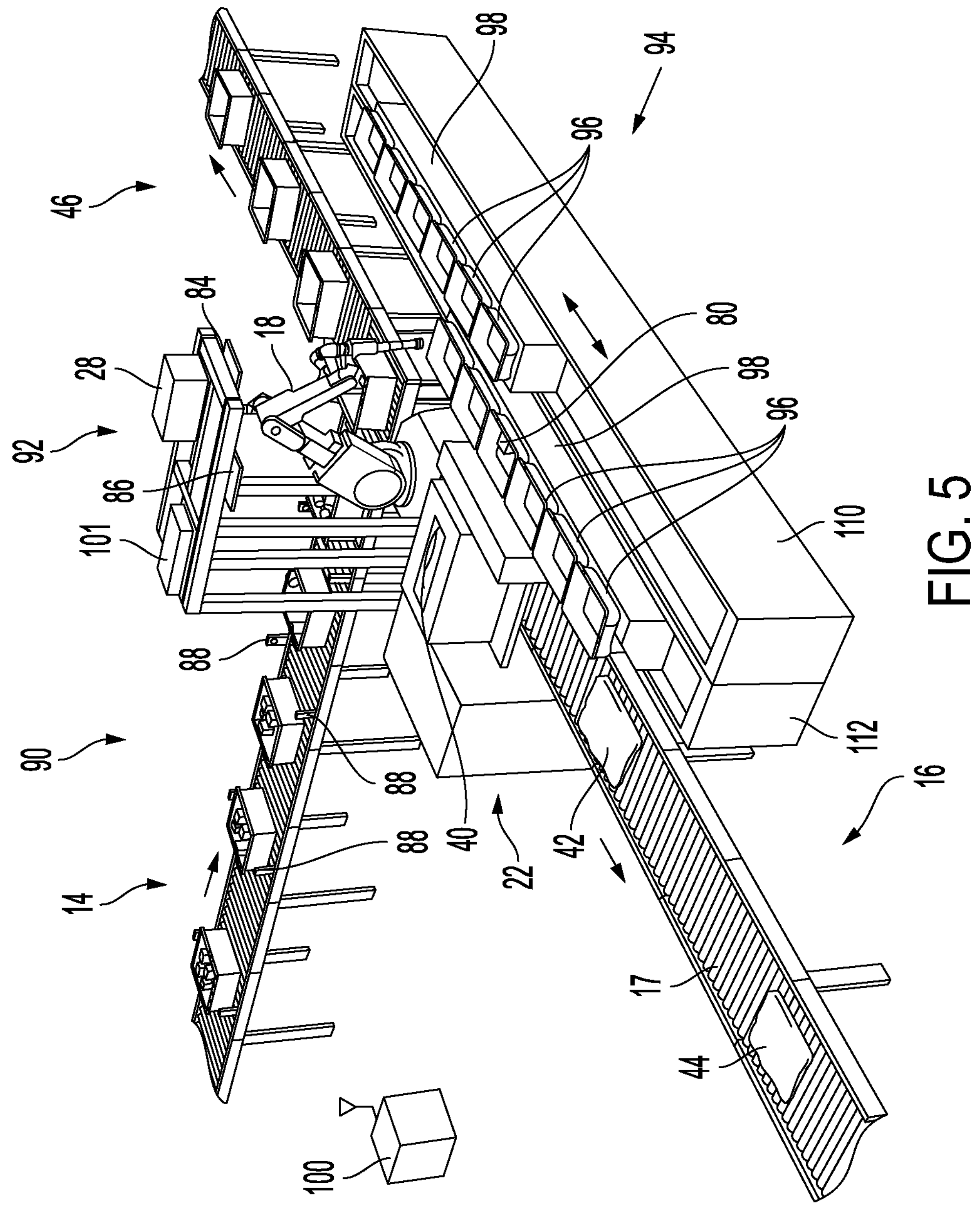
FIG. 5 shows an illustrative diagrammatic view of another object processing system in accordance with an aspect of the present invention present invention that includes an automated bagging system and an intermediate staging area with intermediate storage locations on linear actuators.

FIG. 5 shows an object processing system 90 in accordance with another aspect of the present invention that includes a system of storage locations that move linearly along at least one linear slide. The system 90 includes an object processing station 92 at which objects are processed from an in-feed conveyance system 14 and provided to an output system 16 as discussed above. The processing station 92 includes programmable motion device 18 and may also include an intermediate staging area 94 at which objects may be temporarily placed prior to being moved to the output system 16, which may for example include an automated bagging system 22. The intermediate staging area 94 includes a plurality of intermediate storage locations 96 that move linearly back and forth in slides 98 that move along linear actuator bases 110, 112 as shown. The intermediate storage locations 96 may each receive any object (e.g., 80) for temporarily holding during processing as discussed herein.

Figure 6:
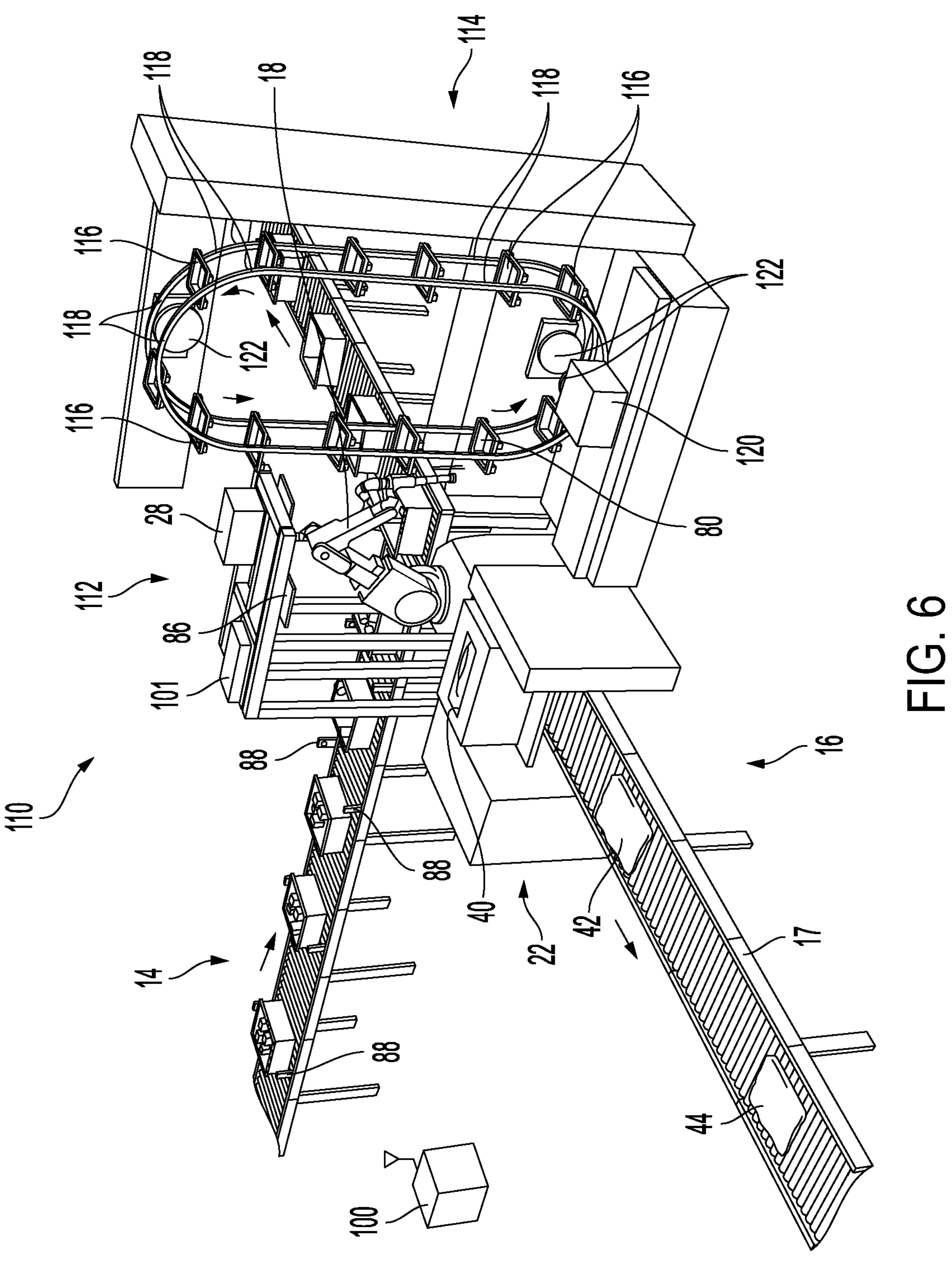
FIG. 6 shows an illustrative diagrammatic view of another object processing system in accordance with an aspect of the present invention that includes an automated bagging system and an intermediate staging area with intermediate storage locations on a vertically rotating track system.

FIG. 6 shows an object processing system 110 in accordance with another aspect of the present invention that includes a plurality of storage locations that move along a continuous vertical track circuit. The system 110 includes an object processing station 112 at which objects are processed from an in-feed conveyance system 14 and provided to an output system 16 as discussed above. The processing station 112 includes programmable motion device 18 and may also include an intermediate staging area 114 at which objects may be temporarily placed prior to being moved to the output system 16, which may for example include an automated bagging system 22. The intermediate staging area 114 includes a plurality of intermediate storage locations 116 that move along a track system 118 in a circuit as shown. The intermediate storage locations 116 may each receive any object (e.g., 80) for temporarily holding during processing as discussed herein. The track 118 may be powered by a power source 120 via drive wheels 122.

In each of the systems discussed herein perception system 82, 84, 86 (e.g., shown in FIGS. 2A-2D) provide perception data that facilitates automated processing of the objects. Additional perception systems 88 may also be provided on the input conveyance system to facilitate processing of input bins (where input objects are provided in input bins). Further, robotic pickers can be augmented with additional perception, manipulation, and motion planning capabilities to allow the system to detect and understand the geometry and position of a picked object and then use that understanding to reorient the object to fit it precisely into a cache location, or any other type of container. This reorientation can be done about any of the three axes of rotation: roll, pitch, or yaw. This allows, for example, a cereal box laying flat on its large side to be rolled so as to be standing up tall when placed (or an object may be positioned for dropping into a slot as discussed below with reference to FIG. 18).

This ability to reorient about an axis of rotation allows the system to pack objects efficiently into a cache location, or to deal with the requirements of the outbound container. For example, if the outbound container is a bag held open in a narrow slot (for example as in an auto-bagging system), the robot can use its reorientation capabilities to ensure objects are oriented to fit into that narrow slot when placing those objects into either a cache location or into the bag itself. Mechanisms that allow cache locations to move aid in the efficiency of this process, as the desired cache location can be brought to a common point in space for the robot to place into it. This point in space can inform the position of any perception sensors required to observe the held object and can inform the motion planning algorithms responsible for the reorientation motion of the robot. These advantages apply to all caching applications described here.

In a simple case for single-unit orders, the robot takes an object out of heterogeneous tote, identifies it, estimates pose-in-hand, and re-orients and places the object in packing for e.g., an auto-bagging system. A passive cache such as shown in FIGS. 1A and 1B is fundamentally a set of discrete locations where, in accordance with certain aspects, all items for a given order can be grouped together. The concept of operations includes (1) a robot picks an object and identifies to which order it belongs, (2) if the order currently in the outbound container is the same as the order for the currently picked object, the robot places the object into the outbound container, and (3) else the robot places the object into the cache location for the order to which the object belongs. Additionally, the robot may pick an object from the cache and place it in the outbound container for the order, thereby freeing up the cache for subsequent use.

In this way, the robot is able to keep track of objects that have been identified and knows where to go to find them when it is ready to fulfill the order requiring those objects. This approach works to augment both pre-pick and post-pick identification strategies described herein. As used herein the term "passive" means that the picker places objects into the cache and then picks them out of the cache at a later time. The cache is a temporary storage location that permits the material handling facility to operate more efficiently by providing flexibility in sequencing orders. The cache permits items pulled from inventory or storage to proceed to an object processing system, such as object processing system 10 without all items necessary to fulfill an order, or when certain items arrive at the object processing system 10 out of sequence, or, for example, when an oversized or heavy item constitutes part of an order. Additionally, the flexibility permits fluctuations in timing or sequence of inventory items when an order exceeds the capacity of one or a series of inventory totes or containers.

In accordance with various aspects therefore, the object processing systems are provided that provide for intermediate storage of objects during processing. Such systems may include such an intermediate staging area that may include a set of static containers arranged horizontally with no motion or mechanisms as shown in FIGS. 1A and 1B, wherein the robot may reach into any of these containers at any particular time to pick the desired item. The intermediate staging area may include any of a set of individual containers that are attached to a horizontal rotating circular mechanism as shown in FIG. 3, such that when a particular item is required, the mechanism will rotate (e.g., in either rotational direction) the precise amount to present the desired item to be picked. The intermediate staging area may be provided as a set of containers that reside on a circuit track or series of conveyor that can be cycled to present the desired container as shown in FIG. 4. The intermediate staging area may include a horizontal, linearly actuated mechanism that can present the specific container to the robot when desired as shown in FIG. 5. The intermediate staging area may include a set of static containers arranged vertically with no motion or mechanisms (wherein the robot can reach into any of these containers at any particular time to pick the desired item), or a set of containers provided on a vertically circulating circuit track as shown in FIG. 6.

In accordance with further aspects, the system may provide an active cache. An active cache extends the concept of a passive cache by allowing the cache location to actively transport items into the outbound container. In this implementation, the picker places items into the cache, and then the cache mechanism is responsible for depositing these items into the final outbound container. This method has several advantages, the most notable being that it saves the picker the work of picking items out of the cache. Some implementations of an active cache allow the picker to address multiple outbound containers by using the cache as a mechanism for sending items to different outbound locations.

Figure 7A:
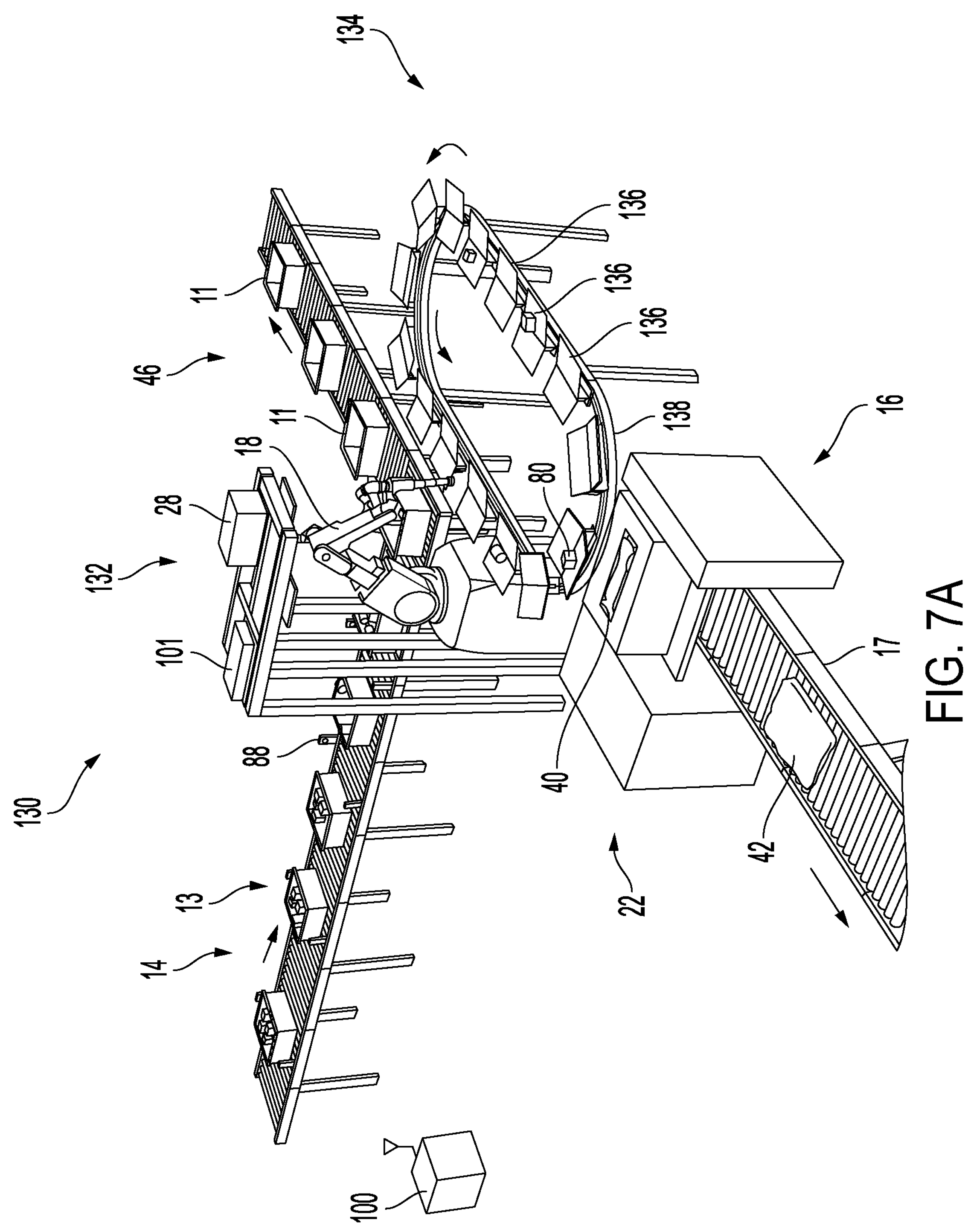
FIGS. 7A and 7B show illustrative diagrammatic views of another object processing system in accordance with an aspect of the present invention that includes an automated bagging system and an intermediate staging area with intermediate storage locations on a rotating tilt tray system, showing an output system with an automated bagging system (FIG. 7A) and showing an output system with a container packing system (FIG. 7B)

In accordance with various aspects, the intermediate staging area may include a plurality of tilting devices that may rotate (e.g., in either rotational direction) to deposit the object to its location. For example, FIG. 7A shows an object processing system 130 in accordance with another aspect of the present invention that includes an object processing station 132 at which objects are processed from an in-feed conveyance system 14 and provided to an output system 16 as discussed above. The processing station 132 includes programmable motion device 18 and may also include an intermediate staging area 134 at which objects may be temporarily placed prior to being moved to the output system 16, which may for example include an automated bagging system 22. The intermediate staging area 134 includes a plurality of intermediate storage locations 136 that move along a track system 138 in a circuit as shown. The intermediate storage locations 136 may each receive any object (e.g., 80) for temporary holding during processing as discussed herein.

Figure 8A:
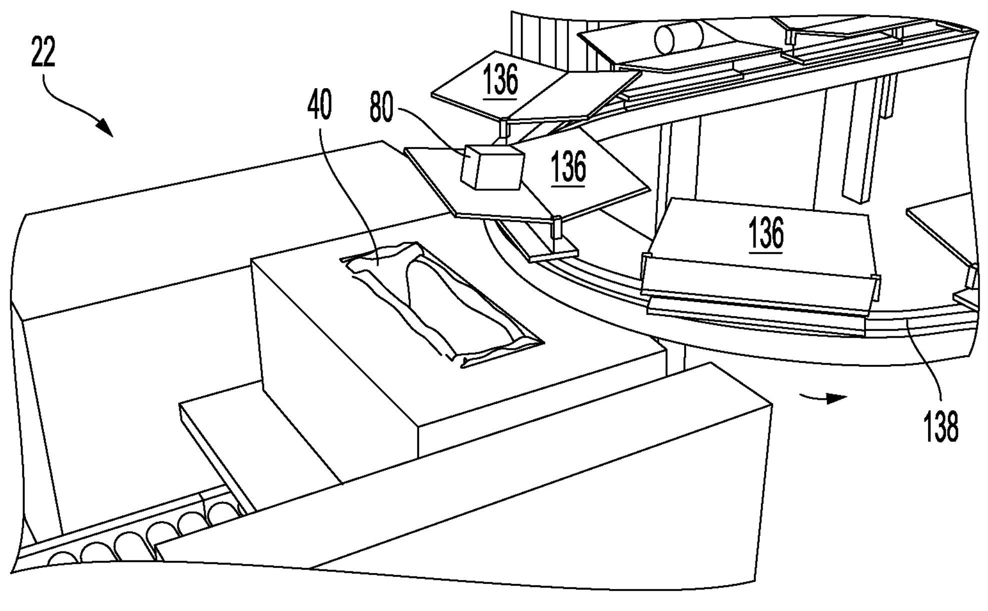
FIGS. 8A and 8B show illustrative diagrammatic enlarged views of an object being positioned above the automated bagging system (FIG. 8A) and being deposited into the automated bagging system (FIG. 8B)
Figure 8B:
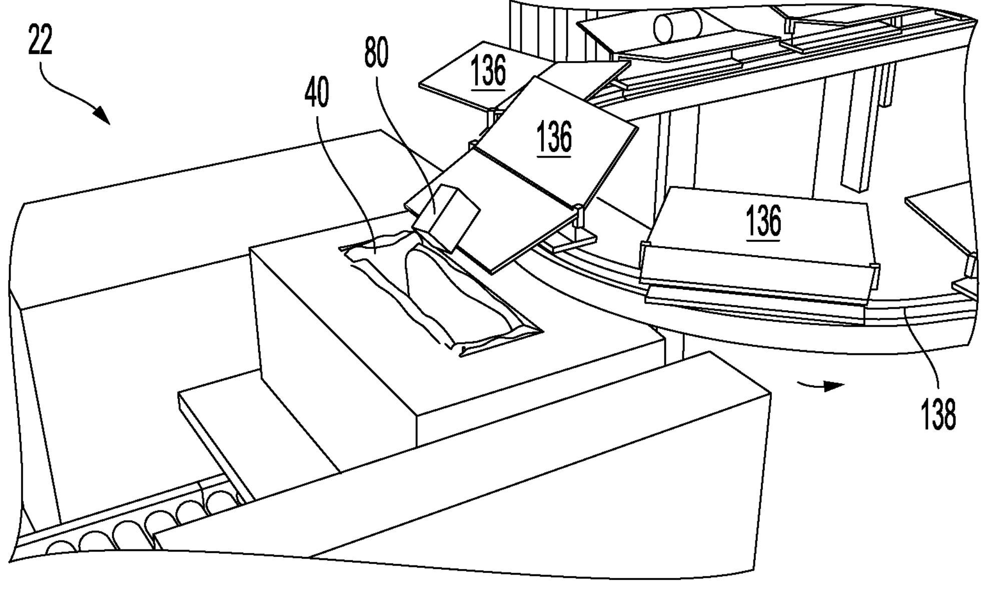

Each of the intermediate storage locations 136 may be provided as a tilt tray that is able to be activated to discharge any object thereon to at least one side (e.g., one or both sides) of the tilt tray. The intermediate storage location 136 with the object thereon is shown in FIG. 8A moving toward the bag formation opening 40 of the automated bagging system 22. The object 80 is then discharged into the bag formation opening 40 directly by the tilt tray intermediate storage location 136 as shown in FIG. 8B. In this way, objects may be selectively deposited directly into the automated bagging system 22 as shown in FIG. 8B from the intermediate staging area 134 by moving the intermediate storage location around the circuit at the intermediate staging area 134.

Figure 7B:
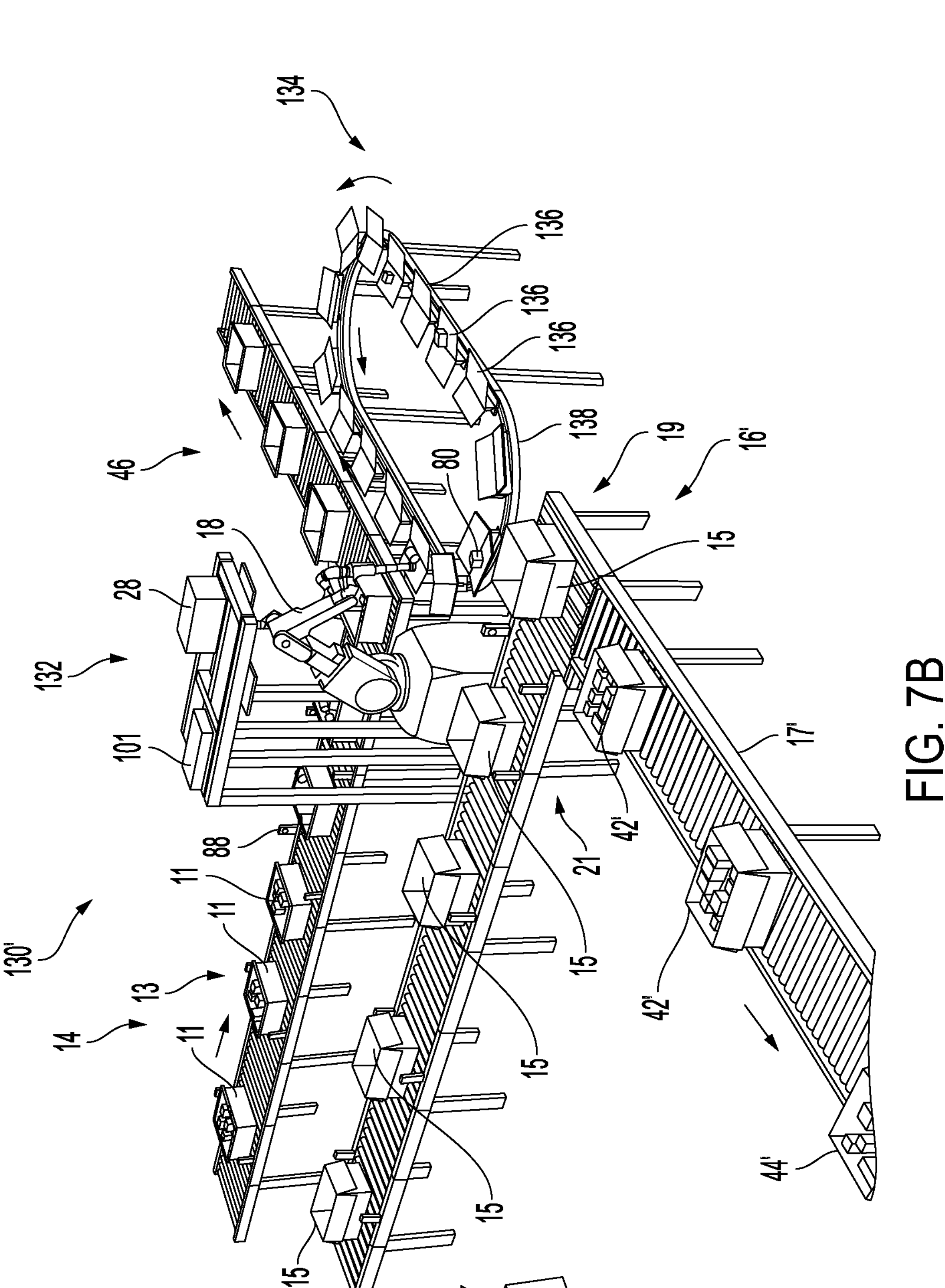

With reference to FIG. 7B, the object processing system 130' in accordance with another aspect of the present invention is shown that includes the object processing station 132 at which objects are processed from an in-feed conveyance system 14 and provided to an output system 16' as discussed above. The processing station 132 includes programmable motion device 18 and may also include an intermediate staging area 134 at which objects may be temporarily placed prior to being moved to the output system 16', which may for example include a packing station 21 that receives empty output totes 15 (e.g., shipping boxes) and packing station 19 that receives either empty output totes 15 or partially full output totes 15 from the packing station 21 as described herein below. The object processing system 130' operates the programmable motion device 18 to transfer items from the input bins 11 to the output tote 15 at the packing station 21 to fulfill the current order and utilizing the intermediate staging area 134 as required to temporarily store items in the intermediate storage location 136 as described herein. The items temporarily stored in any of the intermediate storage location 136 may be selected and grasped by the programmable motion device 18 and placed in the output tote 15 at the packing station 21 as necessary. Additionally, the output tote 15 may be advanced to packing location 19 where items temporarily stored in the intermediate storage location 136 may be directly placed in the output tote 15 by the intermediate staging area 134'. Accordingly, the current output tote 15 at the packing station 21 receives objects from the programmable motion device 18 either directly from the input bins 11 or via the intermediate staging area 134 as discussed herein. Additionally, the output tote 15 receives objects directly from the intermediate staging area 134 at packing location 19 as discussed herein. Full output bins 42' and 44' then advance out of the object processing system 130'.

The object processing system may therefore use the intermediate staging area to hold objects that are later picked up by the programmable motion device for placement into the output system, or to hold objects that are later dropped into the output system via the intermediate staging area. For example, the transfer from the intermediate staging area directly to the output system may be employed to effect a desired sequence of placement of objects to a bagging station or a container. Additionally, efficiencies in the picking of objects at the object processing station 12 may be achieved by having the last of a number (e.g., 2, 3, 4, etc.) of the objects to be picked for a single output package placed onto the intermediate staging area so that these objects may be delivered to an output container at packing location 19 while a new output container presented at the packing location 21 begins to receive objects from a subsequent input bin 11.

Figure 9:
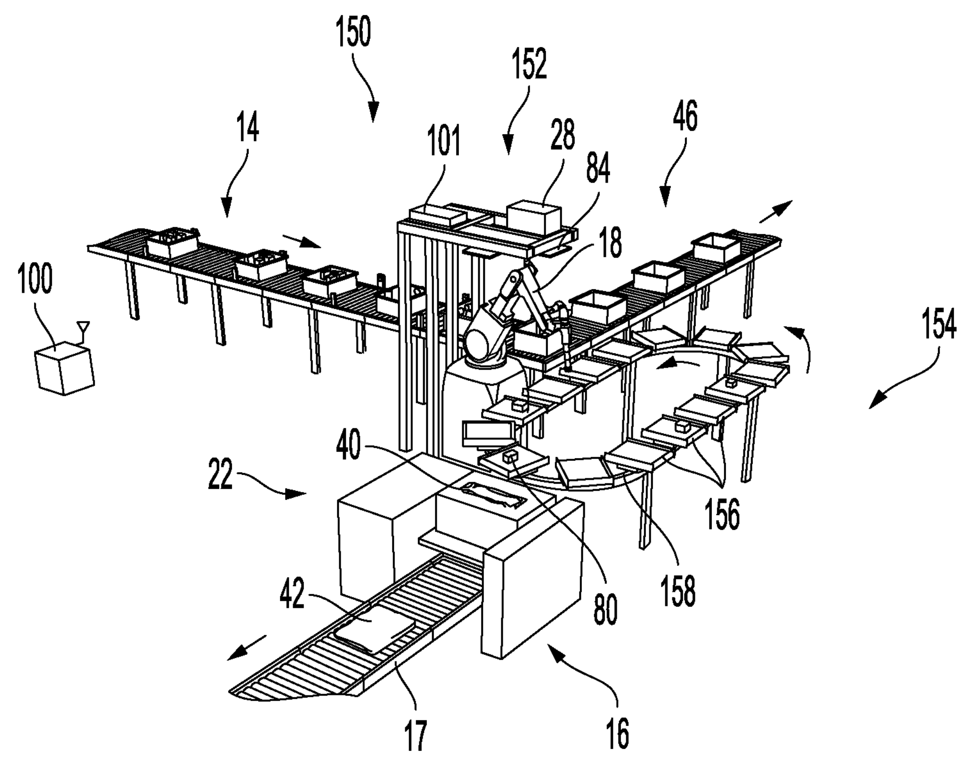
FIG. 9 shows an illustrative diagrammatic view of another object processing system in accordance with an aspect of the present invention that includes an automated bagging system and an intermediate staging area with intermediate storage locations on a rotating cross-belt conveyor system.
Figure 10:
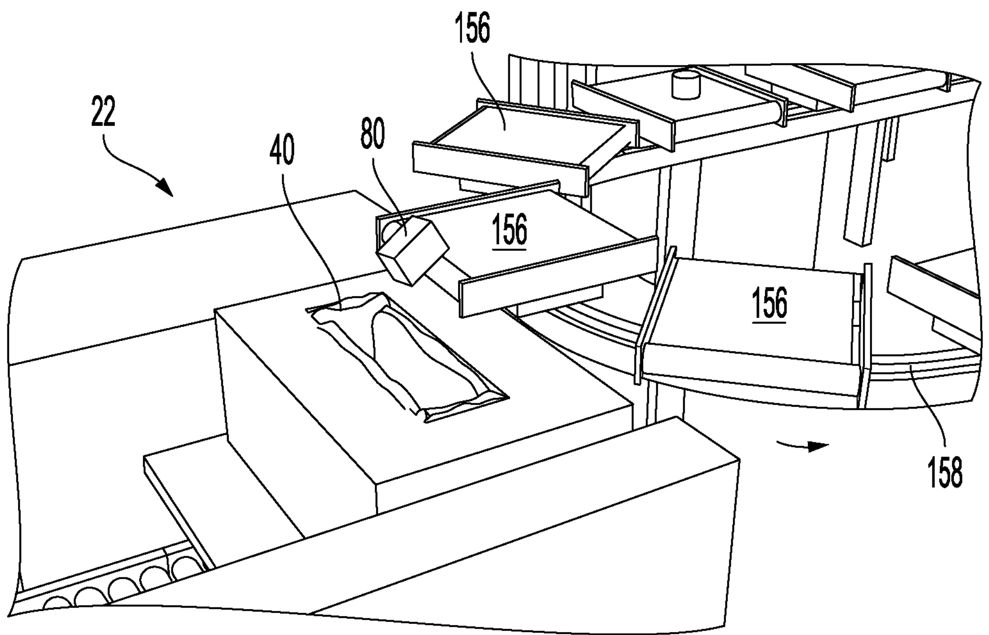
FIG. 10 shows an illustrative diagrammatic enlarged view of a portion of the system of FIG. 9 showing an object being deposited into the automated bagging system.

In accordance with further aspects, the intermediate staging area may include a plurality of circulating belted conveyors. The conveyor may be activated to dump an object into the outbound container. For example, FIGS. 9 and 10 show an object processing system 150 in accordance with another aspect of the present invention that includes an object processing station 152 at which objects are processed from an in-feed conveyance system 14 and provided to an output system 16 as discussed above. The processing station 152 includes programmable motion device 18 and may also include an intermediate staging area 154 at which objects may be temporarily placed prior to being moved to the output system 16, which may for example include an automated bagging system 22. The intermediate staging area 154 includes a plurality of intermediate storage locations 156 that move along a track system 158 in a circuit as shown. The intermediate storage locations 156 may each receive any object (e.g., 80) for temporary holding during processing as discussed herein. Each storage location 156 may be provided as a cross-belt conveyor as shown or may be provided with walls more as a container with the floor being actuatable to discharge the object.

Each of the intermediate storage locations 156 may be provided as a cross-conveyor that is able to be activated to discharge any object thereon to at least one side (e.g., one or both sides) of the cross-conveyor. The intermediate storage location 156 with the object thereon is shown in FIG. 9 moving toward the bag formation opening 40 of the automated bagging system 22. The object 80 is then discharged into the bag formation opening 40 directly by the cross conveyor intermediate storage location 156 as shown in FIG. 10. In this way, objects may be selectively deposited directly into the automated bagging system 22 from the intermediate staging area 154 by moving the intermediate storage location around the circuit at the intermediate staging area 154. In accordance with further aspects, the intermediate storage locations 156 may each selectively provide sudden vibrations to shake the object from the storage location to deposit the object into the outbound location.

Figures 11, 12:
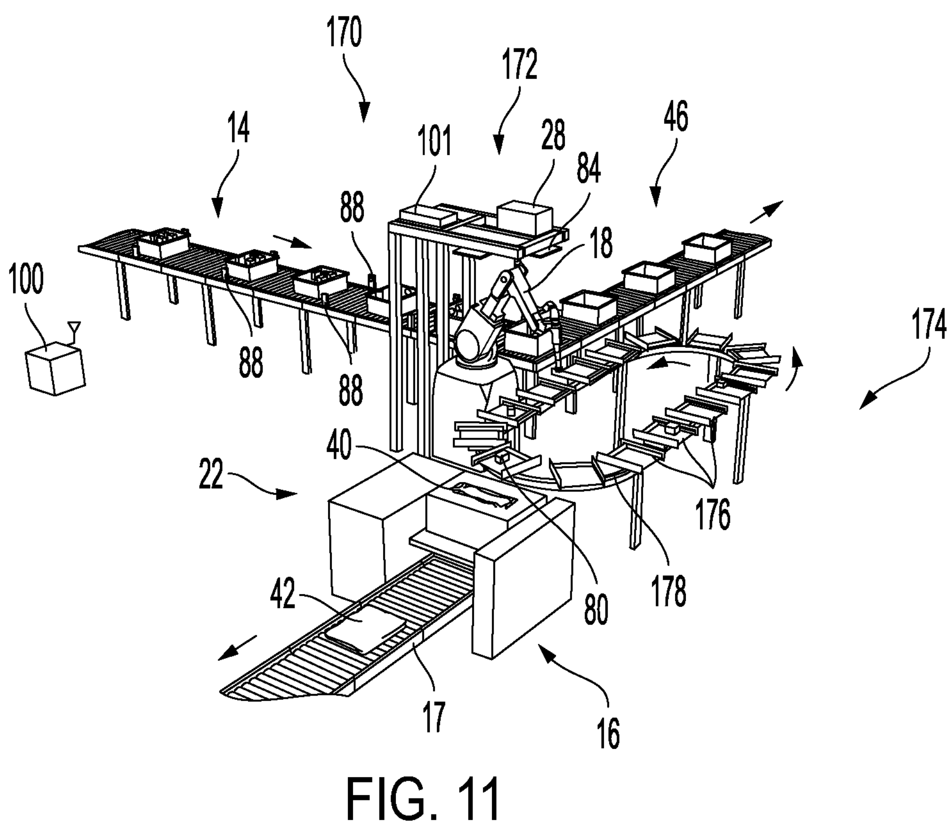
FIG. 11 shows an illustrative diagrammatic view of another object processing system in accordance with an aspect of the present invention that includes an automated bagging system and an intermediate staging area with intermediate storage locations on a dischargeable tray conveyor system that includes push bars for discharging objects.
FIG. 12 shows an illustrative diagrammatic enlarged view of a portion of the system of FIG. 11 showing an object being deposited into the automated bagging system.

In accordance with further aspects, the intermediate staging area may include an automatic sweeping mechanism that pushes the desired objects into the outbound location. For example, FIGS. 11 and 12 show an object processing system 170 in accordance with another aspect of the present invention that includes an object processing station 172 at which objects are processed from an in-feed conveyance system 14 and provided to an output system 16 as discussed above. The processing station 172 includes programmable motion device 18 and may also include an intermediate staging area 174 at which objects may be temporarily placed prior to being moved to the output system 16, which may for example include an automated bagging system 22. The intermediate staging area 174 includes a plurality of intermediate storage locations 176 that move along a track system 178 in a circuit as shown. The intermediate storage locations 176 may each receive any object (e.g., 80) for temporary holding during processing as discussed herein.

Each of the intermediate storage locations 176 may be provided as a cross-push device that is able to be activated to discharge any object thereon to at least one side (e.g., one or both sides) of the cross-push device. The intermediate storage location 176 with the object thereon is shown in FIG. 11 moving toward the bag formation opening 40 of the automated bagging system 22. The object 80 is then discharged into the bag formation opening 40 directly by the cross-push intermediate storage location 176 as shown in FIG. 12 via a push-bar 177. In this way, objects may be selectively deposited directly into the automated bagging system 22 from the intermediate staging area 174 by moving the intermediate storage location around the circuit at the intermediate staging area 174. In accordance with further aspects, the system may employ air flow from the push bar 177, which may remain stationary in a rearward position or may move as discussed above.

Figure 13:
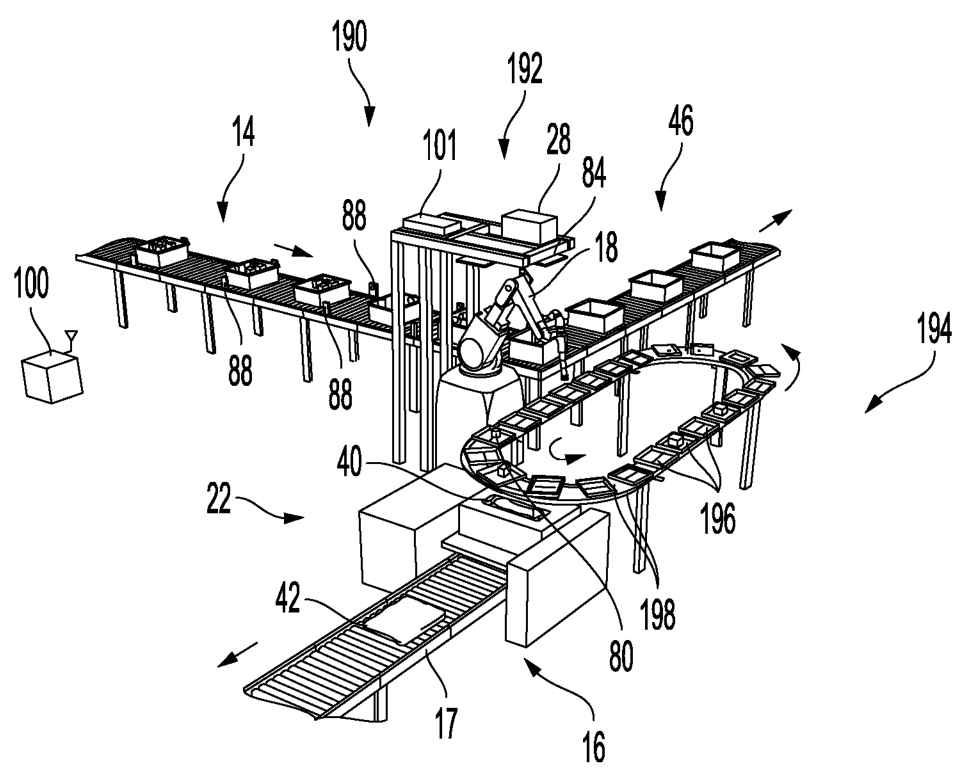
FIG. 13 shows an illustrative diagrammatic view of another object processing system in accordance with an aspect of the present invention that includes an automated bagging system and an intermediate staging area with intermediate storage locations on a bomb-bay tray conveyor system.
Figure 14:
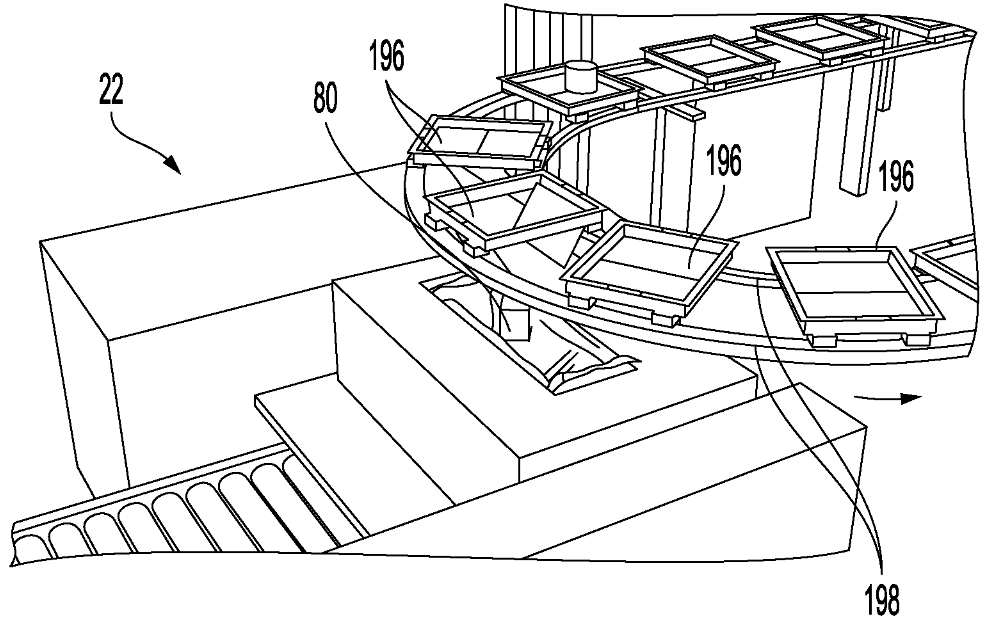
FIG. 14 shows an illustrative diagrammatic enlarged view of a portion of the system of FIG. 13 showing an object being deposited into the automated bagging system.

In accordance with further aspects, the intermediate staging area may include intermediate storage locations that each include a trap door that when activated drops an object into the outbound location. For example, FIGS. 13 and 14 show an object processing system 190 in accordance with another aspect of the present invention that includes an object processing station 192 at which objects are processed from an in-feed conveyance system 14 and provided to an output system 16 as discussed above. The processing station 192 includes programmable motion device 18 and may also include an intermediate staging area 194 at which objects may be temporarily placed prior to being moved to the output system 16, which may for example include an automated bagging system 22. The intermediate staging area 194 includes a plurality of intermediate storage locations 196 that move along a track system 198 in a circuit as shown. The intermediate storage locations 196 may each receive any object (e.g., 80) for temporary holding during processing as discussed herein.

Each of the intermediate storage locations 196 may be provided as a bomb-bay device that is able to be activated to discharge any object thereon to at least one side (e.g., one or both sides) of the bomb-bay. The intermediate storage location 196 with the object thereon is shown in FIG. 13 moving toward the bag formation opening 40 of the automated bagging system 22. The object 80 is then discharged into the bag formation opening 40 directly by the bomb-bay intermediate storage location 196 as shown in FIG. 14. In this way, objects may be selectively deposited directly into the automated bagging system 22 from the intermediate staging area 194 by moving the intermediate storage location around the circuit at the intermediate staging area 194.

Figure 15:
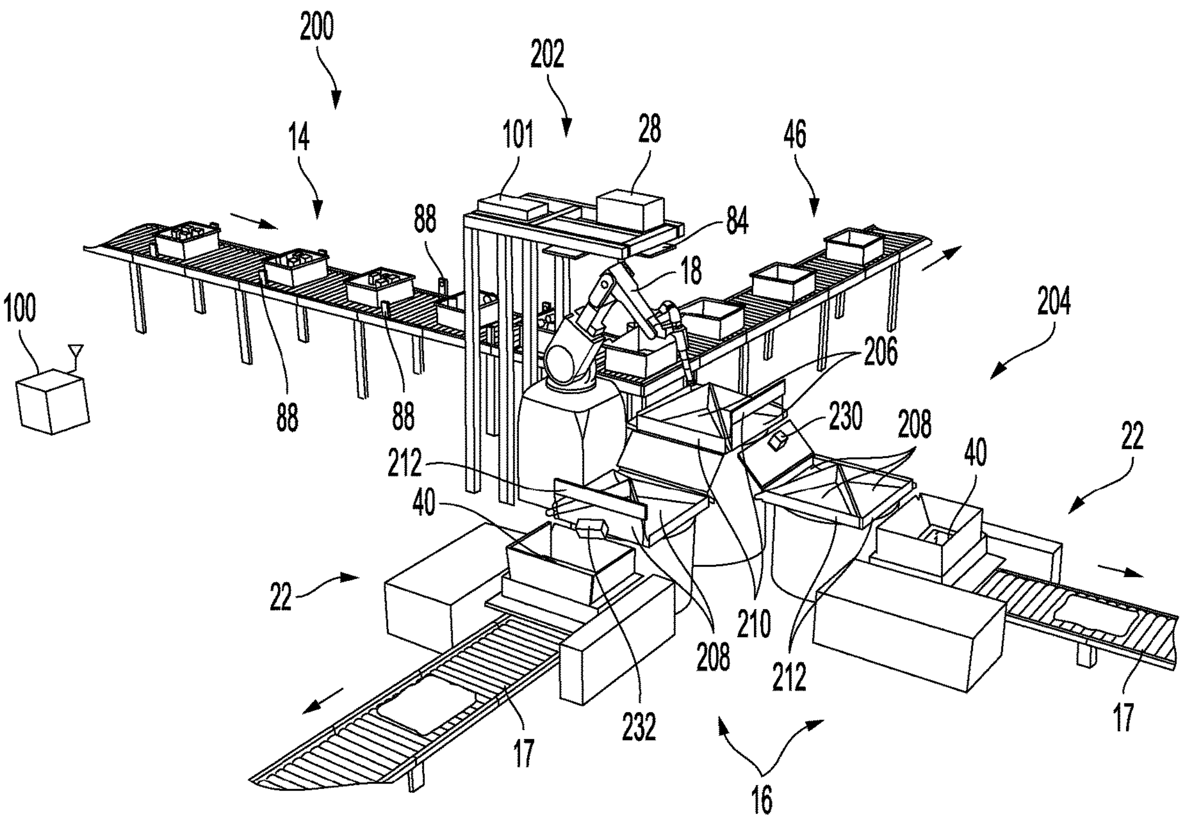
FIG. 15 shows an illustrative diagrammatic view of another object processing system in accordance with an aspect of the present invention that includes an automated bagging system and an intermediate staging area with intermediate storage locations that in turn feed additional intermediate storage locations.

In accordance with further aspects and with reference to FIG. 15, the object processing system 200 may include an object processing station 202 at which objects are processed from an in-feed conveyance system 14 and provided to an output system 16 as discussed above. The processing station 202 includes programmable motion device 18 and may also include an intermediate staging area 204 at which objects may be temporarily placed prior to being moved to the output system 16, which may for example include a plurality of automated bagging systems 22. The intermediate staging area 204 includes a plurality of primary intermediate storage locations 206 that in turn feed a plurality of secondary intermediate storage locations 208. The programmable motion device 18 places objects into a primary intermediate storage location 206 at a home position (e.g., when closest to the device 18). The primary storage locations 206 each include a sloped floor and an actuator 210 for selectively permitting any contents therein (e.g., object 230 as shown) to fall into a secondary intermediate location 208. The secondary storage locations may also include an actuator 212 for selectively permitting any contents therein (e.g., object 232 as shown) to fall into a bag formation opening 40 of an automated bagging system 22. The system therefore provides a central location where objects are dropped, and a series of actuators may then redirect the falling object so that it lands in the desired intermediate storage location.

Each of the intermediate storage locations 206 are provided on a rotating platform with respect to a base and may be rotated in either rotational direction, and each of the intermediate storage locations 208 are provided on rotating stages with respect to bases as shown and may be rotated in either rotational direction. Guide ramps may be provided to facilitate the transfer of objects between the locations 206 and the locations 208 as well as the locations 208 and the output locations 16 (e.g., the bag formation openings 40). Each intermediate storage location may therefore include a sloped floor and utilize an actuating side wall that opens one of the side walls, thereby allowing the desired object to slide downward into the outbound container.

In accordance with various aspects, robotic pickers use different techniques for identifying objects. Some techniques allow the picker to identify an object before picking it, allowing it to pick a specific object from a container storing many objects. Other techniques, for example detecting and reading a barcode, usually only work after the picker is holding the object and can see it from all sides.

Figure 16A:
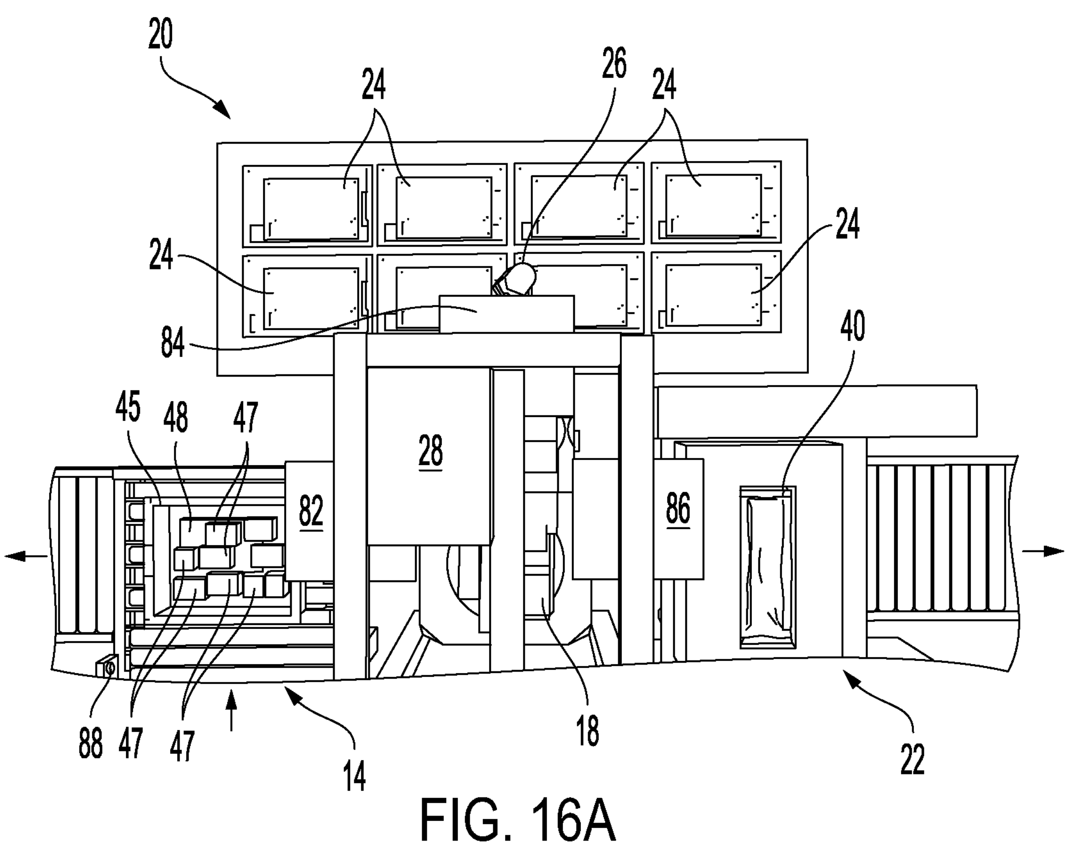
FIGS. 16A and 16B show illustrative diagrammatic plan views of a portion of the object processing system of FIG. 1A, showing smaller objects being presented at the input area on top of a larger object (FIG. 16A) and showing the smaller objects having been moved to intermediate storage locations such that the larger object may now be grasped and moved (FIG. 16B)
Figure 16B:
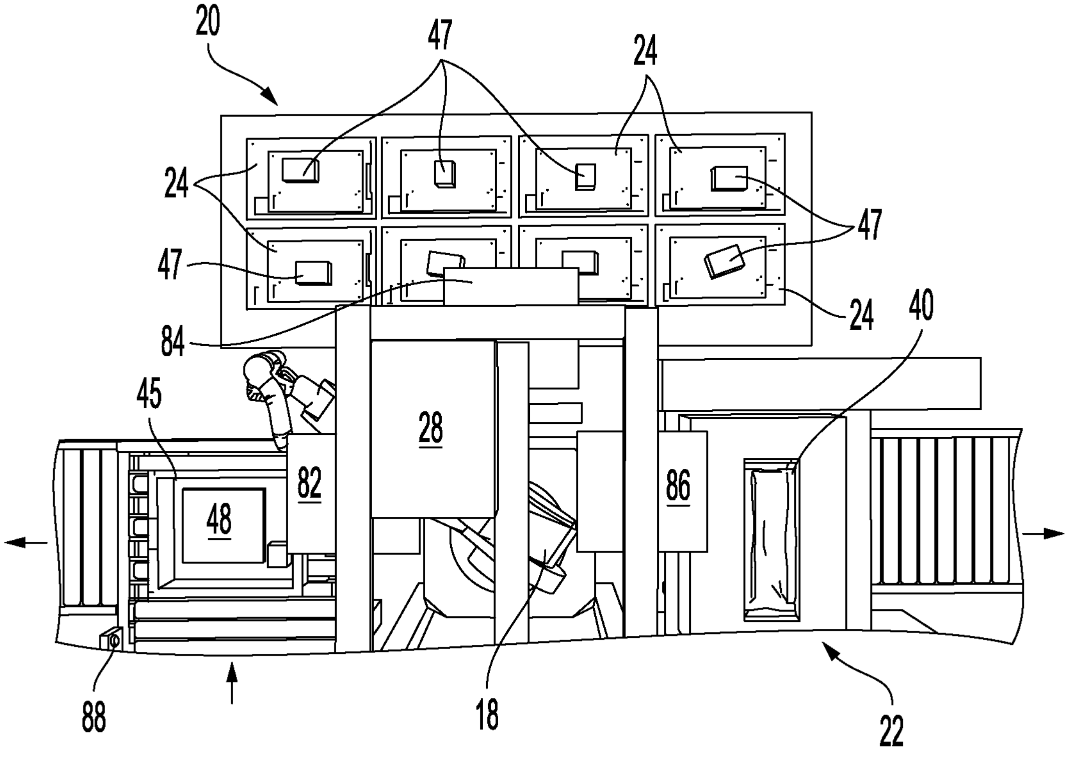
Figure 17:
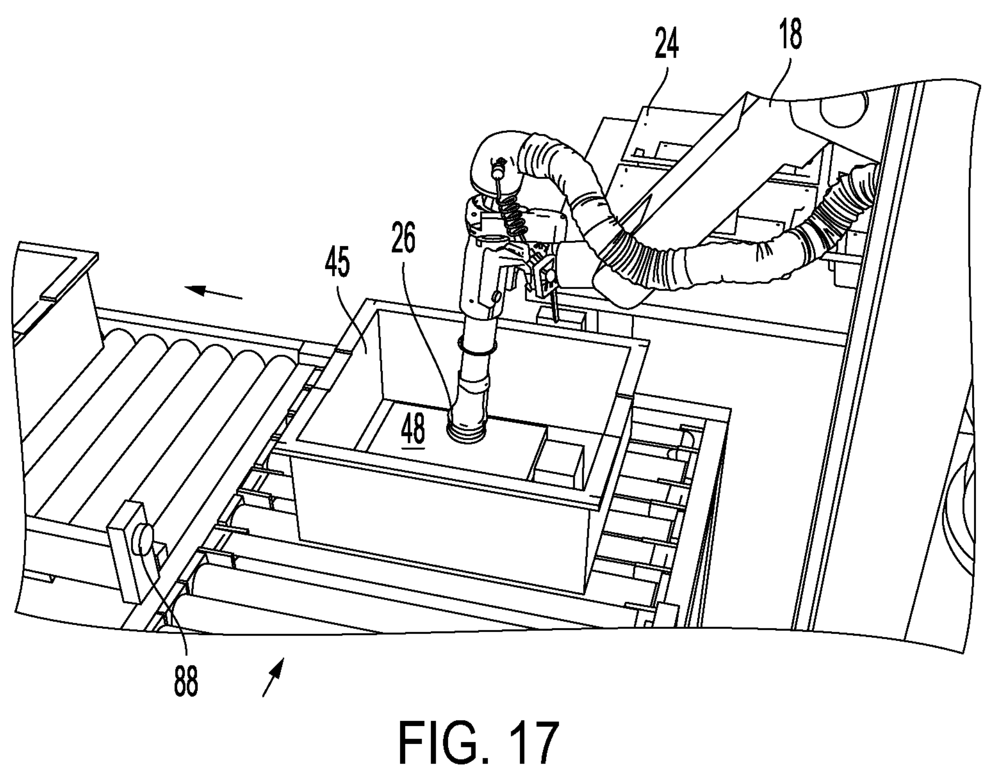
FIG. 17 shows an illustrative diagrammatic view of a large object being grasped.
Figure 18:
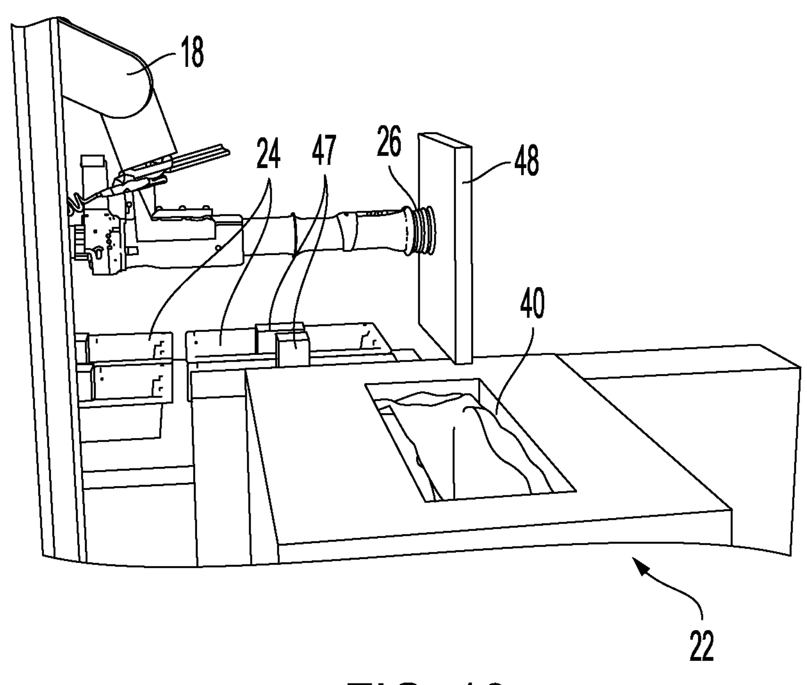
FIG. 18 shows an illustrative diagrammatic view of the object of FIG. 17 being positioned over the automated bagging system.

FIG. 16A for example, shows the system of FIG. 1A with a received input bin or tote 45 that includes a plurality of objects 47 on top of a larger object 48. In this illustrative example, the object processing system 12 performs the task of bagging the larger object 48 first before subsequently bagging remaining objects 47. The object processing system 12 uses the intermediate staging area 20 to temporarily hold any of the objects 47 so that it can identify and remove the larger object 48 for bagging in the automated bagging system 22. With reference to FIG. 16B the objects 47 are shown placed into a plurality of intermediate storage locations 24, leaving the object 48 exposed to the perception system 82 and end-effector 26 of the articulated arm 18. The object 48 may then be grasped by the end-effector 26 of the articulated arm 18 (as shown in FIG. 17) and then moved directly to the automated bagging system 22. Once at the automated bagging system 22, the articulated arm 18 may manipulate the orientation and pose of the object (as shown in FIG. 18) for proper placement into the bag formation opening 40 of the automated bagging system 22. The system may then add any further (e.g., smaller) objects such as any of the objects 47 into the automated bagging system 22. In this way, not only may objects be placed in desired orientations and poses at destination location, but the order of packing or placing objects may be dynamically controlled.

Both of these methods may benefit from a utility cache. This cache is not used principally to segregate items by order, but instead to temporarily store objects picked from the inbound container. This allows the picker to get picked objects out of the way so that other objects in the container may be perceived and picked. For example, when picking from a batch picked tote, the picker may want to remove objects on the top of the pile of objects in the tote to see what is under them. In this case, the picker can use a utility cache to store these objects after picking them.

By providing the robotic picker with distinct locations for placing objects, the robotic system can remember where it put an identified object in the cache. This allows the picker to rapidly find that object again, with no need to identify it a second time.

In accordance with further aspects, the intermediate staging area may be provided as the destination location at which objects are provided in destination containers. For example, the outbound containers themselves may serve as the caching locations, providing temporary storage while the outbound containers are being filled. In this approach, the picker is placing objects directly into each outbound container, with no intermediate location. This requires that the picker be able to address many outbound containers, so that it can place the objects for order A into the container for order A, and so on for the other orders. Similar to the system of FIGS. 1A and 1B, the intermediate storage locations are used for temporary storage, but in this case, the storage locations are provided as outbound containers.

Figure 19:
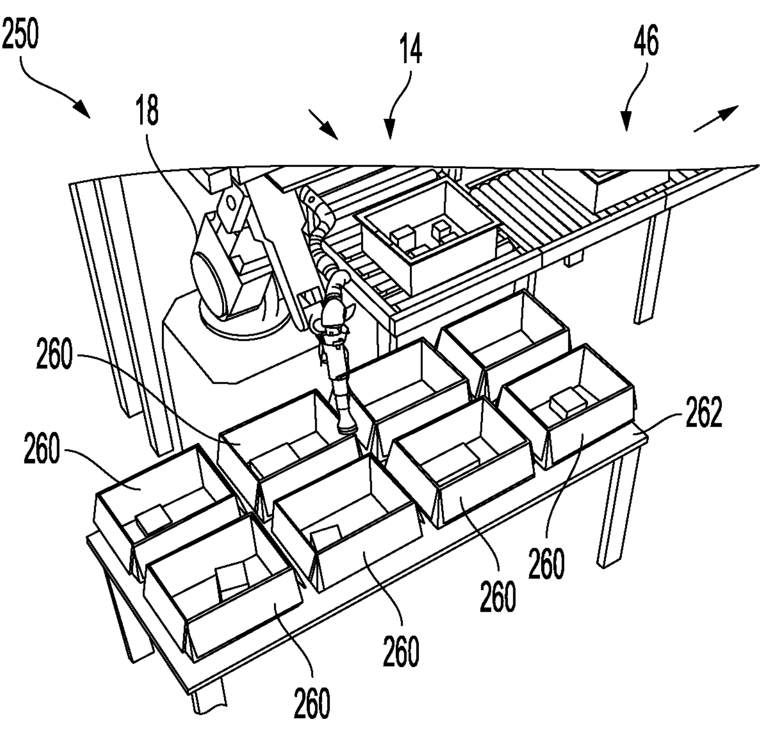
FIG. 19 shows an illustrative diagrammatic view of another object processing system in accordance with an aspect of the present invention that includes static intermediate storage locations.

FIG. 19 shows a portion of an object processing system 250 that includes an in-feed conveyance system 14 that provides objects to the programmable motion device 18, and outbound containers 260 that are provided on a static surface 262. The outbound containers may be, for example, shipping containers, and the system uses the outbound containers 260 as temporary storage locations while the outbound storage containers are being packed for shipping.

Figure 20:
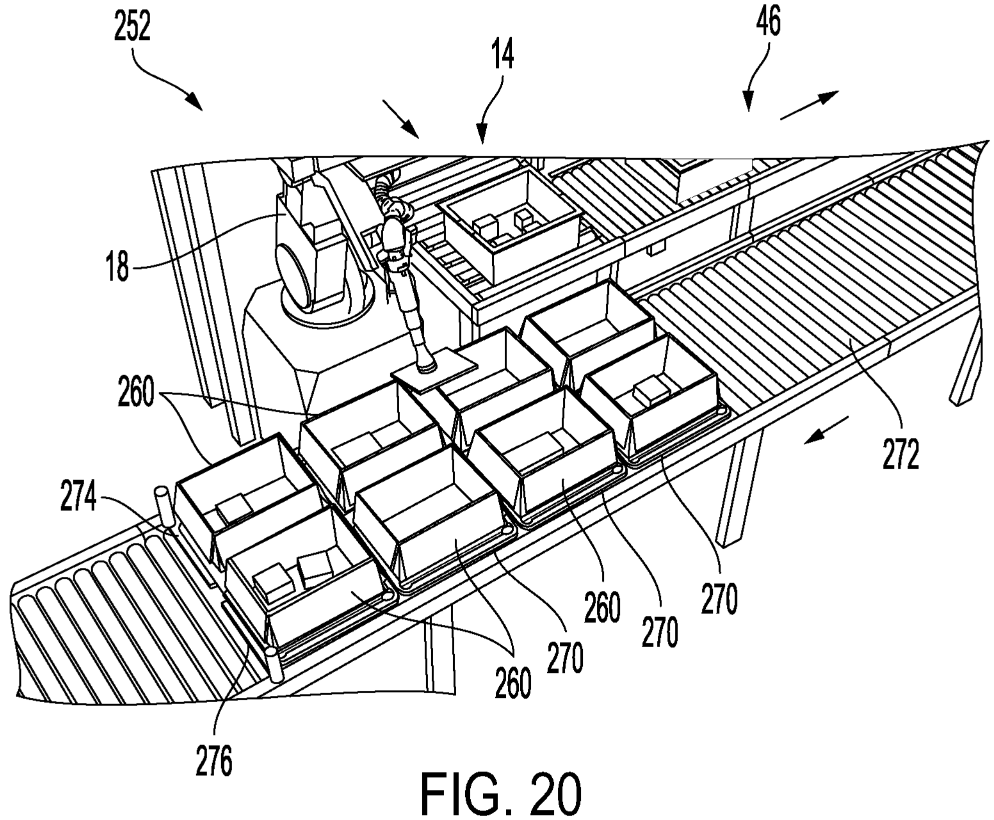
FIG. 20 shows an illustrative diagrammatic view of another object processing system in accordance with an aspect of the present invention that includes intermediate storage locations on an output conveyor system.

FIG. 20 shows a portion of an object processing system 252 that includes an in-feed conveyance system 14 that provides objects to the programmable motion device 18, and outbound containers 260 that are provided on box trays 270 on a conveyance surface 272. The containers 260 and box trays 270 may be temporarily held in place (e.g., in an ordered fashion due to the box trays 270) by gates 274, 276. Again, the outbound containers may be, for example, shipping containers, and the system uses the outbound containers 260 as temporary storage locations while the outbound storage containers are being packed for shipping.

Figure 21:
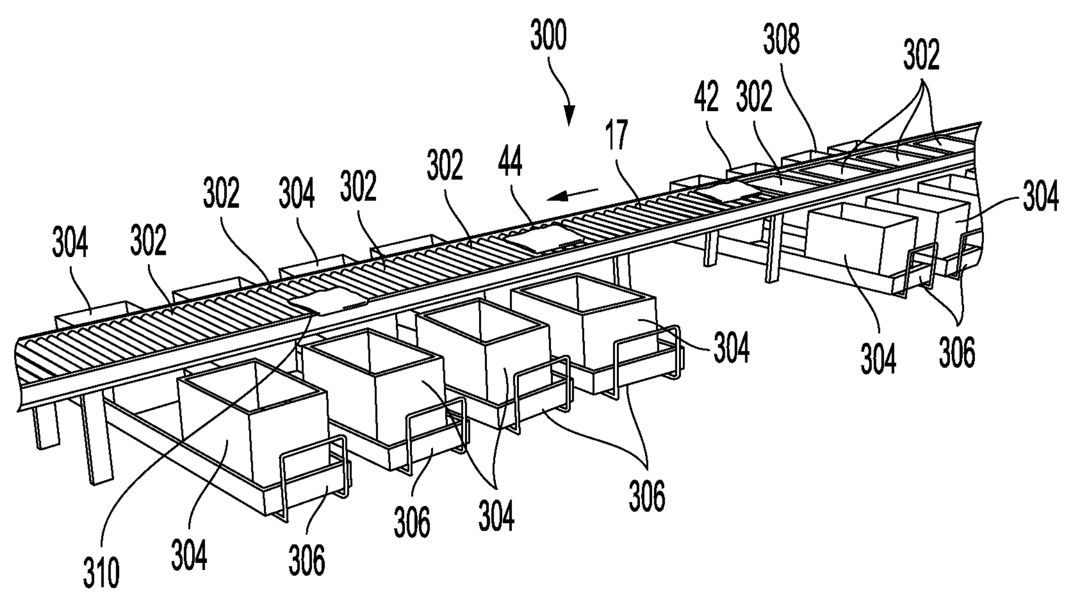
FIG. 21 shows an illustrative diagrammatic view of the output conveyor system of FIG. 20 leading to destination locations via right-angle-transfer systems.

With further reference to FIG. 21, the output systems of FIGS. 1-15 may lead, for example to any of manual or automated servicing systems for processing completed containers or packages. As shown for example at 300 in FIG. 21, the conveyor 17 may lead to an automated processing area in which bi-directional diverters 302 are provided (e.g., as elevatable belts that are elevationally adjustable between rollers of the conveyor 17) for directing an object thereon into one of two boxes or bins 304 on either side of the conveyor 17. The boxes or bins 304 may further be provided on pull-out drawers 306. Objects (e.g., bags) 308 and 310 are for example, being diverted to a box or bin 304 on a far side of the conveyor 17 and a near side of the conveyor 17 respectively as shown in FIG. 21. Once a pair of opposing boxes or bins 304 is full or otherwise finished being processed, the pull-out drawer 306 associated therewith may be removed for further processing.

Figure 22:
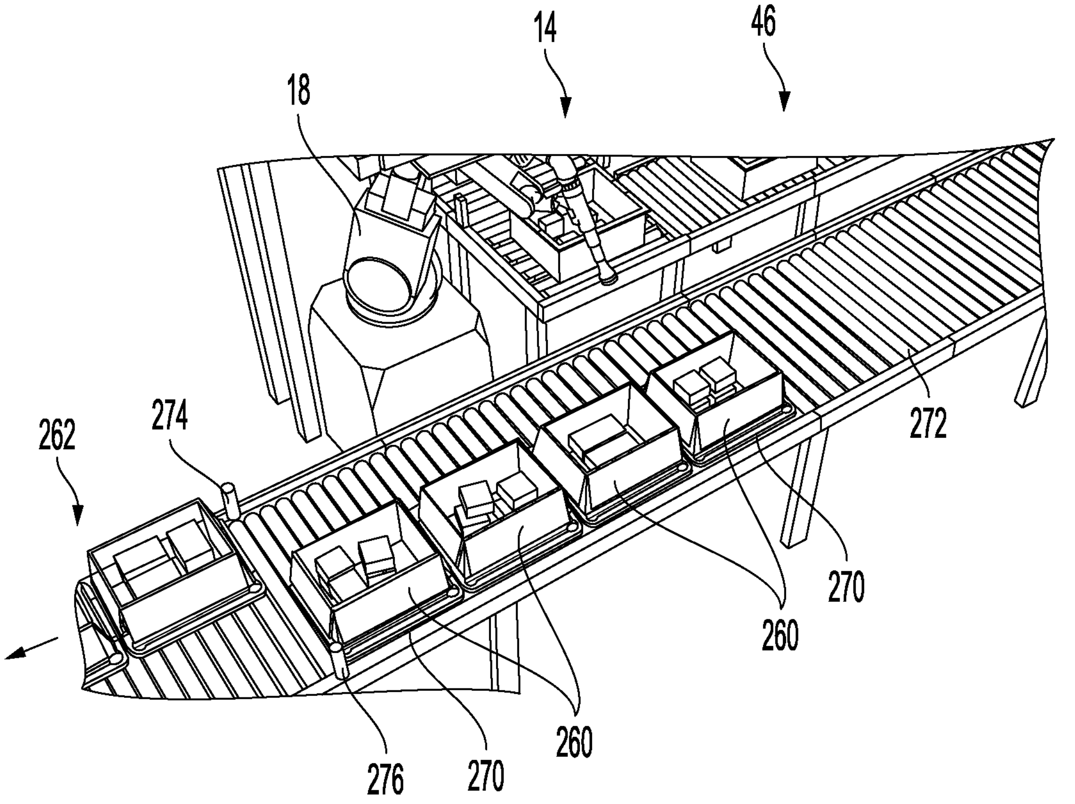
FIG. 22 shows an illustrative diagrammatic view of the object processing system of FIG. 20 wherein one row only of intermediate storage locations are permitted to move at a time.

With further reference to FIG. 22, the system of FIG. 20 may (when the containers 260 are full or otherwise finished being processed), release one set of containers 260 at a time by actuating one of the two gates 274, 276 at a time as shown at 262. In this way, a singulated stream of the containers may be provided to a further manual or automated processing system. Empty containers 260 on box trays 270 may be replenished to the system of FIGS. 20 and 22 as needed.

Those skilled in the art will appreciate that numerous modifications and variations may be made to the above disclosed embodiments without departing from the spirit and scope of the present invention.

What is claimed is:

1. A method of processing objects with a programmable motion device, said method comprising:

receiving a plurality of received objects at an input area proximate the programmable motion device;

selecting and grasping a first object of the plurality of received objects from the input area using the programmable motion device;

moving the first object to a cache area using the programmable motion device, said cache area being proximate the programable motion device;

selecting and grasping a second object of the plurality of received objects;

moving the second object to a first destination location using the programmable motion device;

selecting and grasping the first object from the cache area using the programmable motion device; and moving the first object to the first destination location using the programmable motion device, wherein the cache area is configured to temporarily store objects and to permit the programmable motion device to move objects stored in the cache area to one or more destination locations in an order that is independent of an order in which the programmable motion device moved the objects from the input area into the cache area.

2. The method of claim 1, wherein the first object is not yet associated with an assigned destination location when moved to the cache area.

3. The method of claim 1, wherein the first destination location is not yet ready to receive the first object when the first object is moved to the cache area.

4. The method of claim 1, wherein the cache area receives a plurality of cached objects that include the first object.

5. The method of claim 1, wherein the cache area includes a first portion that moves with respect to a second portion, said first portion including a first portion area for receiving the first object.

6. The method of claim 5, wherein the first portion receives a plurality of cached objects among a plurality of first portion areas.

7. The method of claim 6, wherein the first portion includes an actuation mechanism for ejecting a cached object from any of the first portion areas.

8. The method of claim 1, wherein the plurality of received objects is provided in at least one tote or bin at the input area.

9. The method of claim 1, wherein the one or more destination locations are provided proximate the programmable motion device.

10. The method of claim 1, wherein the first destination location includes an auto-bagging system.

11. The method of claim 1, wherein the cache area is provided by a dynamically assigned destination location of a plurality of destination locations that includes the first destination location.

12. A method of processing objects with a programmable motion device, said method comprising:

receiving a plurality of objects at an input area proximate the programmable motion device;

selecting, grasping and moving the plurality of objects by the programmable motion device in a first order from the input area to a plurality of cache locations at a cache area; and selecting, grasping and moving the plurality of objects from the plurality of cache locations by the programmable motion device in a second order that is different than the first order to at least one destination location, wherein the second order is one of a plurality of orders in which the plurality of objects are capable of being moved from the plurality of cache locations at the cache area to the at least one destination location.

13. The method of claim 12, wherein the plurality of objects includes a first object that is first in the first order of the plurality of objects that are moved to the plurality of cache locations, and wherein the first object is not yet associated with an assigned destination location when moved to the cache area.

14. The method of claim 12, wherein the plurality of objects includes a first object that is first in the first order of the plurality of objects that are moved to the plurality of cache locations, and wherein the first object is moved to the cache area when a destination location that is assigned to the first object is not yet ready to receive the first object.

15. The method of claim 12, wherein the cache area includes a first portion that moves with respect to a second portion, said first portion including a first portion area for receiving the first object.

16. The method of claim 15, wherein the first portion receives a plurality of cached objects among a plurality of first portion areas.

17. The method of claim 16, wherein the first portion includes an actuation mechanism for ejecting a cached object from any of the first portion areas.

18. The method of claim 12, wherein the plurality of received objects is provided in at least one tote or bin at the input area.

19. The method of claim 12, wherein at least one destination location is provided proximate the programmable motion device.

20. The method of claim 12, wherein the at least one destination location includes an auto-bagging system.

21. The method of claim 12, wherein the cache area is provided by a dynamically assigned destination location of a plurality of destination locations that includes the first destination location.

22. An object processing system comprising:

an output system;

an object processing station that receives objects from an input conveyance system and provides objects to the output system; and an intermediate cache area including a plurality of intermediate storage locations at which a subset of the plurality of objects received at the object processing station are placed prior to being moved to the output system, wherein the intermediate cache area is configured to temporarily store the subset of objects and to permit the subset of objects stored in the intermediate cache area to be moved to the output system in an order that is independent of an order in which the subset of objects were provided from the object processing station to the intermediate cache area.

23. The object processing system as claimed in claim 22, wherein the intermediate cache area includes intermediate storage locations that move.

24. The object processing system as claimed in claim 23, wherein the intermediate storage locations move horizontally in a circuit.

25. The object processing system as claimed in claim 23, wherein the intermediate storage locations move vertically in a circuit.

26. The object processing system as claimed in claim 23, wherein the intermediate storage locations move reciprocally linearly.

27. The object processing system as claimed in claim 22, wherein each of the plurality of objects is provided to the output system via the intermediate storage locations.

28. The object processing system as claimed in claim 27, wherein each intermediate storage location includes a tilt-tray.

29. The object processing system as claimed in claim 27, wherein each intermediate storage location includes a conveyor section.

30. The object processing system as claimed in claim 27, wherein each intermediate storage location includes a bomb-bay drop section.

* * * * *